United States Patent
McGuire et al.

(10) Patent No.: US 12,540,838 B2
(45) Date of Patent: Feb. 3, 2026

(54) BRACKET ASSEMBLY

(71) Applicant: ILLINOIS TOOL WORKS INC., Glenview, IL (US)

(72) Inventors: Michael S. McGuire, Brookfield, IL (US); John F. Healey, Naperville, IL (US)

(73) Assignee: Illinois Tool Works Inc., Glenview, IL (US)

( * ) Notice: Subject to any disclaimer, the term of this patent is extended or adjusted under 35 U.S.C. 154(b) by 154 days.

(21) Appl. No.: 18/232,701

(22) Filed: Aug. 10, 2023

(65) Prior Publication Data
US 2024/0053174 A1 Feb. 15, 2024

Related U.S. Application Data

(60) Provisional application No. 63/522,673, filed on Jun. 22, 2023, provisional application No. 63/425,777, filed on Nov. 16, 2022, provisional application No. 63/396,635, filed on Aug. 10, 2022.

(51) Int. Cl.
*G01D 11/30* (2006.01)
*G01D 11/24* (2006.01)
*B60R 11/00* (2006.01)

(52) U.S. Cl.
CPC .......... *G01D 11/30* (2013.01); *G01D 11/245* (2013.01); *B60R 2011/0026* (2013.01)

(58) Field of Classification Search
CPC .................. G01D 11/30; G01D 11/245; B60R 2011/0026
See application file for complete search history.

(56) References Cited

U.S. PATENT DOCUMENTS

| | | | |
|---|---|---|---|
| 8,146,450 B2 | 4/2012 | Theml | |
| 9,849,840 B2 | 12/2017 | Okitsu | |
| 10,627,267 B2 | 4/2020 | Vidal | |
| 2013/0076905 A1* | 3/2013 | Blake, III | G03B 17/02 |
| | | | 348/148 |

(Continued)

FOREIGN PATENT DOCUMENTS

| | | | | |
|---|---|---|---|---|
| DE | 102009011614 A1 * | 9/2010 | | B60R 11/02 |
| DE | 102018222745 B3 * | 2/2020 | | |

(Continued)

OTHER PUBLICATIONS

International Search Report and Written Opinion in PCT/US2023/030005, dated Nov. 16, 2023.

*Primary Examiner* — Jamel E Williams
(74) *Attorney, Agent, or Firm* — Quarles & Brady LLP

(57) ABSTRACT

A bracket assembly includes a bracket body with a pivoting portion and a sensor assembly removably attached to the bracket body. The sensor assembly includes a connector configured to be removably attached to the pivoting portion of the bracket body, a sensor body configured to be removably coupled to the connector, a sensor attached to the sensor body, and one or more sensor fasteners configured to engage the bracket body. The sensor assembly is rotatable relative to the bracket body via the pivoting portion between a first position, in which the sensor assembly is at an angle relative to the bracket body, and a second position, in which the sensor assembly is removably secured to the bracket body via the one or more sensor fasteners.

20 Claims, 26 Drawing Sheets

(56) References Cited

U.S. PATENT DOCUMENTS

| | | | |
|---|---|---|---|
| 2016/0229355 A1* | 8/2016 | Hayashi | G01D 11/245 |
| 2024/0067103 A1* | 2/2024 | Iverson | B60R 11/0241 |
| 2024/0198926 A1* | 6/2024 | Hart | G03B 17/561 |

FOREIGN PATENT DOCUMENTS

| | | | | |
|---|---|---|---|---|
| DE | 102016000851 B4 * | 1/2023 | | B60R 11/04 |
| EP | 3173290 A1 * | 5/2017 | | |
| EP | 3173290 B1 | 1/2019 | | |
| EP | 4480757 A1 * | 12/2024 | | B60R 11/04 |
| WO | WO-2007101787 A2 * | 9/2007 | | B60R 11/00 |
| WO | WO-2020140016 A1 * | 7/2020 | | B60R 11/04 |

* cited by examiner

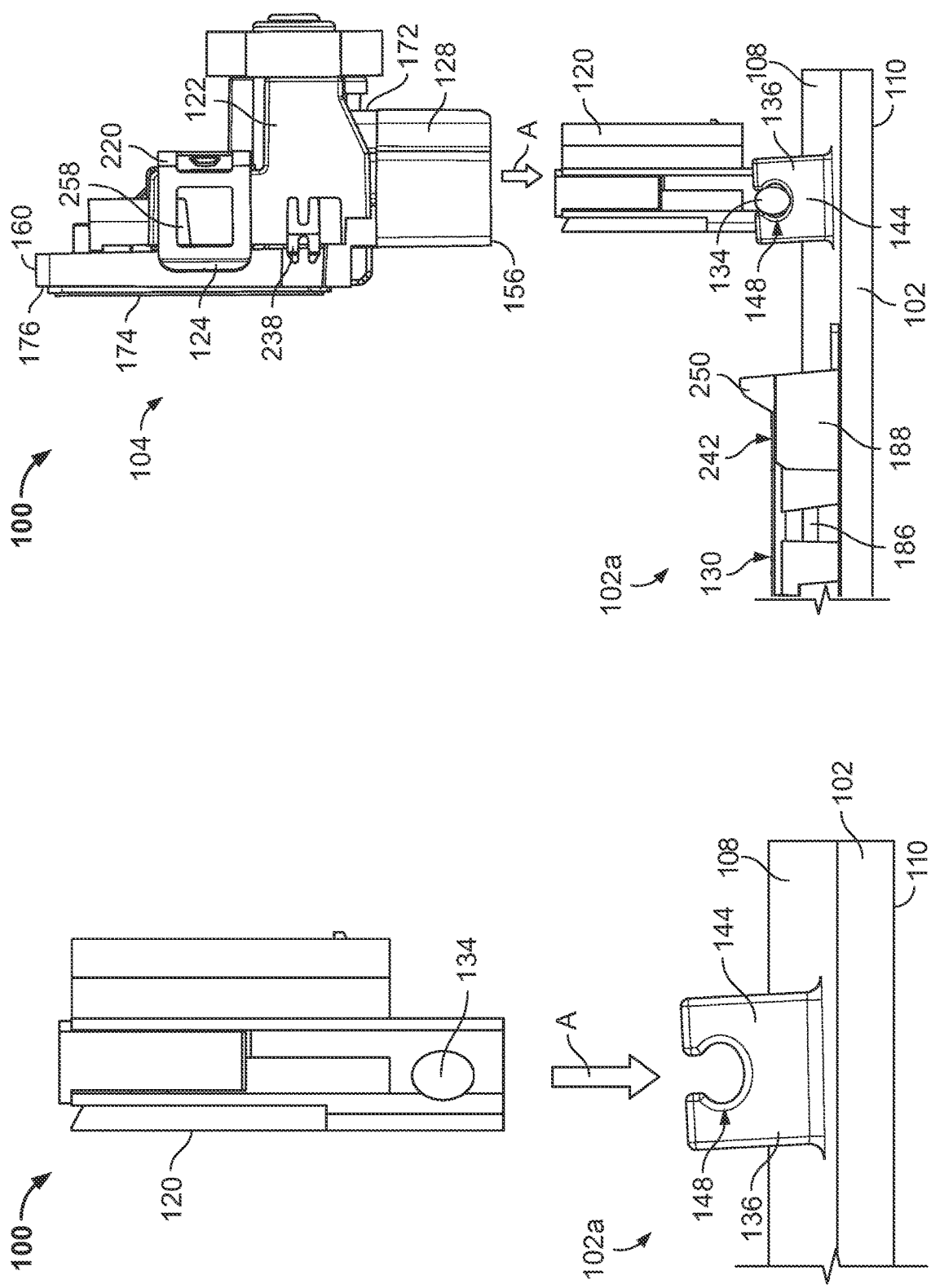

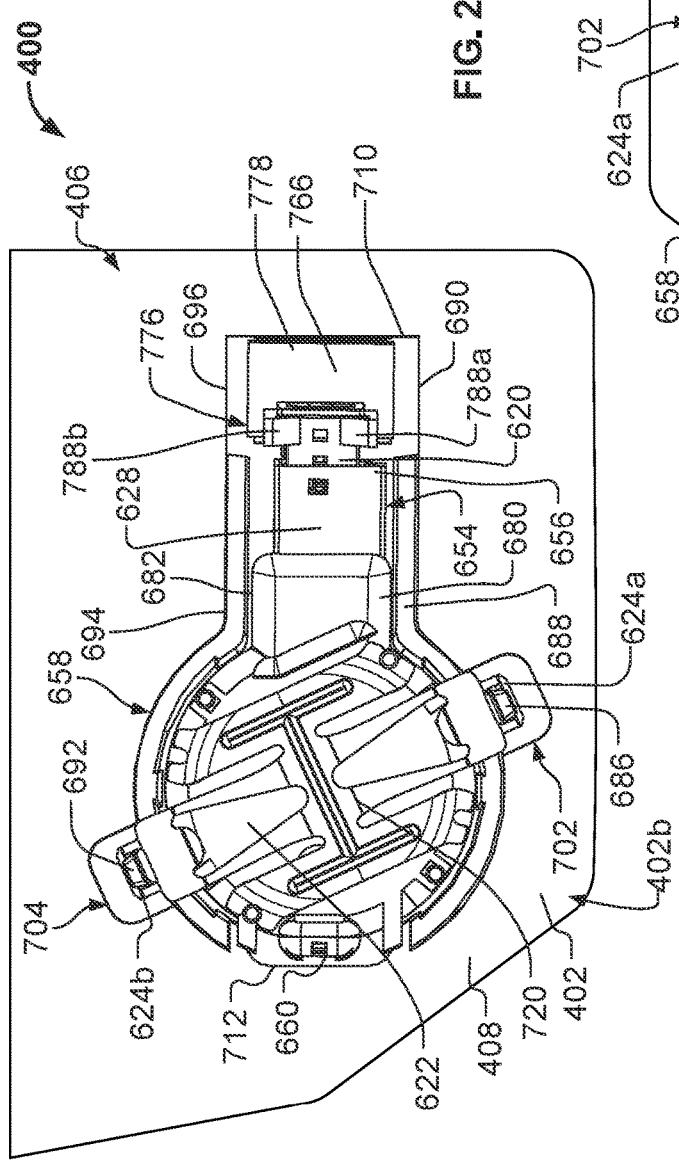
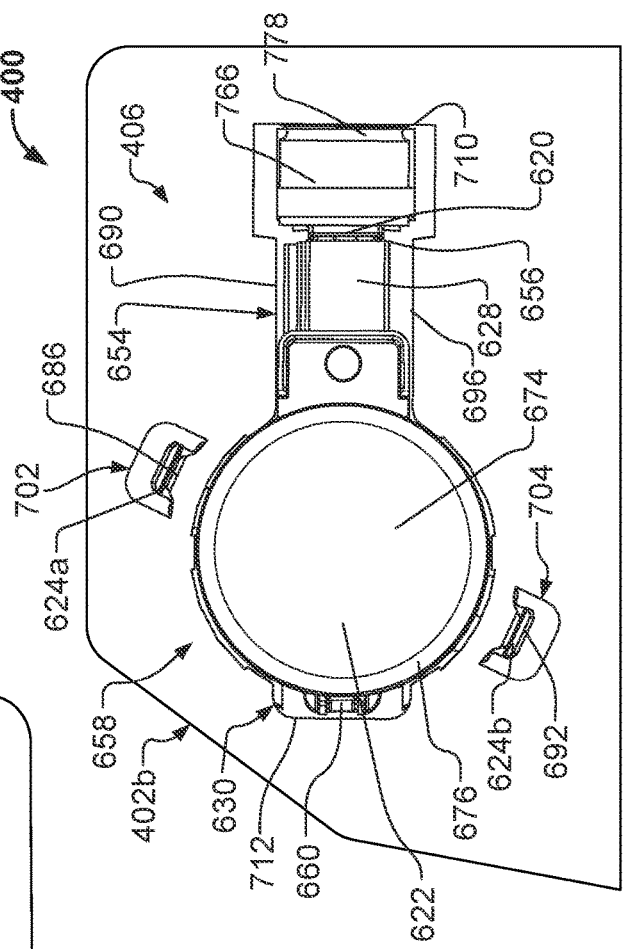
FIG. 29
FIG. 30

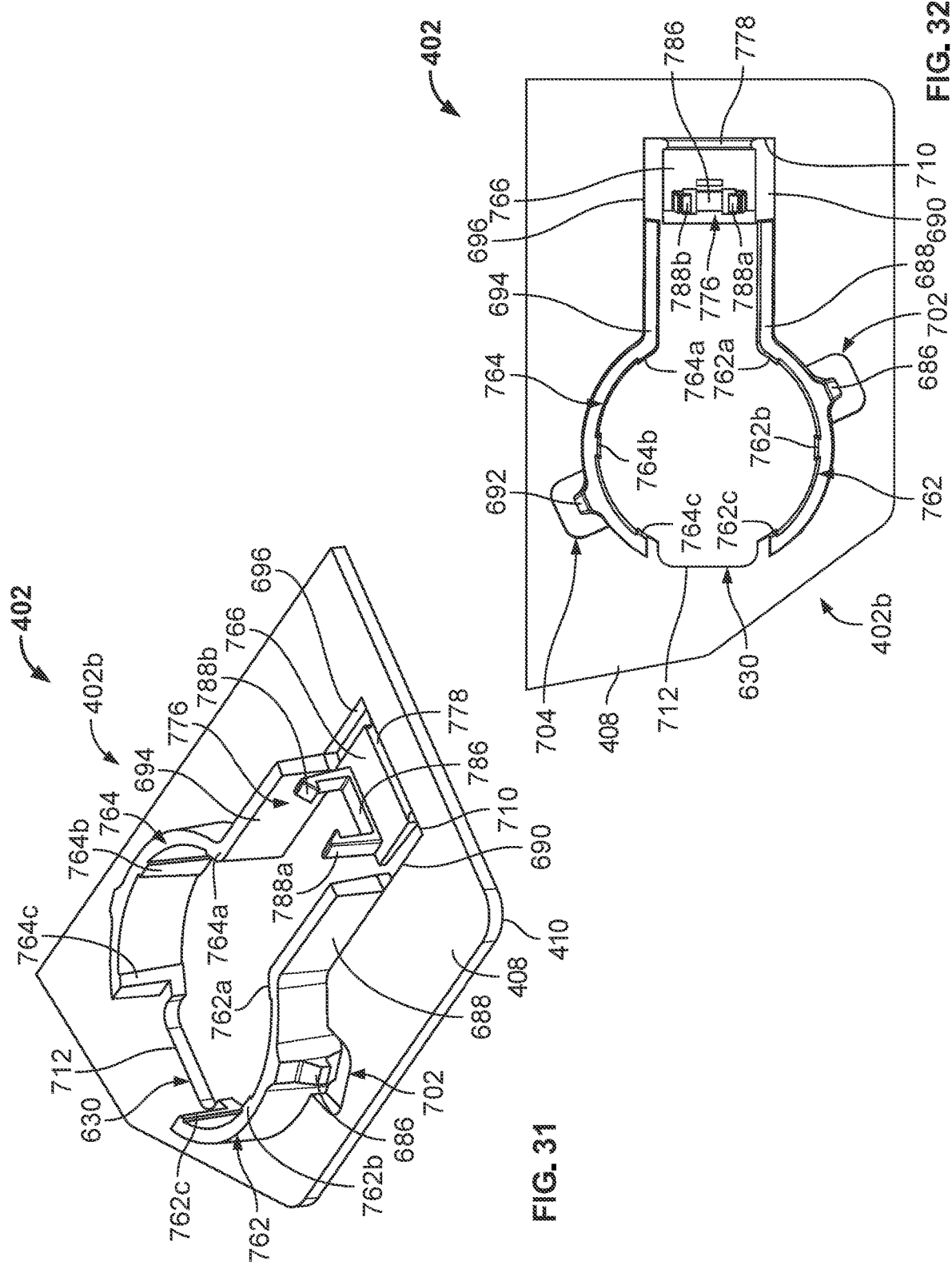

BRACKET ASSEMBLY

CROSS REFERENCE TO RELATED APPLICATIONS

This application claims the benefit of and priority to the following applications, the contents of which are incorporated herein by reference in their entirety: (i) U.S. Provisional Application No. 63/396,635, filed on Aug. 10, 2022, and entitled "BRACKET ASSEMBLY WITH INTEGRATED PIVOTING CONNECTOR"; (ii) U.S. Provisional Application No. 63/425,777, filed on Nov. 16, 2022, and entitled "BRACKET ASSEMBLY"; and (iii) U.S. Provisional Application No. 63/522,673, filed on Jun. 22, 2023, and entitled "BRACKET ASSEMBLY".

BACKGROUND

A bracket assembly can include a sensor and a bracket body for mounting the sensor. The sensor may be attached to the bracket body during an initial installation of the sensor to the bracket body. Further, in some cases, the sensor may need to be repaired or replaced, which can require removal of the sensor from the bracket body after installation. However, common bracket assemblies can result in damage to the sensor, the bracket body, or an electrical circuit of the bracket body when the sensor is initially installed or later removed. What is needed is a bracket assembly that addresses one or more of these shortcomings.

SUMMARY

The following presents a simplified summary of one or more aspects of the present disclosure, to provide a basic understanding of such aspects. While some examples may be discussed as including certain aspects or features, all discussed examples may include any of the discussed features. Unless expressly described, no one aspect or feature is essential to achieve technical effects or solutions discussed herein.

In one aspect, a bracket assembly includes a bracket body and a sensor assembly removably attached to the bracket body. The sensor assembly includes a connector configured to be removably attached to the bracket body and pivotable about a connector axis relative to the bracket body, a sensor body configured to be removably coupled to the connector and, when the sensor body is removably coupled to the connector, a sensor attached to the sensor body, and one or more fasteners extending outwardly from the sensor body and configured to engage the bracket body when the sensor body is rotated toward the bracket body to removably secure the sensor assembly to the bracket body. The sensor assembly is rotatable via the connector between a first position, in which the sensor assembly is at an angle relative to the bracket body, and a second position, in which the sensor assembly is removably secured to the bracket body via the one or more fasteners.

In some embodiments, the connector is an electrical connector that is configured to be in electrical communication with an electrical circuit disposed on the bracket body. In some embodiments, at least a portion of the electrical circuit is a flexible circuit that is electrically coupled to the connector at one end and attached to the bracket body at the other end. In some embodiments, the connector includes a pivot shaft extending outwardly from opposing sides of the connector along the connector axis, the pivot shaft being configured to be pivotably received by the bracket body. In some embodiments, the pivot shaft is configured to be received within a pivot shaft opening extending through opposing connector protrusions of the bracket body. In some embodiments, the pivot shaft has an oblong shaped cross section that is configured such that, with the connector in a first orientation, the pivot shaft is removable from the pivot shaft opening, and, with the connector in an orientation that is different than the first orientation, the pivot shaft is not removable from the pivot shaft opening.

In some embodiments, the one or more fasteners includes a first fastener extending outwardly from a first lateral side of the sensor body and a second fastener extending outwardly from a second lateral side of the sensor body, opposite the first lateral side. In some embodiments, the first fastener is a first clip configured to removably engage a first fastener protrusion of the bracket body, and the second fastener is a second clip configured to removably engage a second fastener protrusion of the bracket body. In some embodiments, the first and second clips are part of a clip bracket that is attached to the sensor body, the clip bracket including a clip bracket base integrally formed with the first and second clips. In some embodiments, the clip bracket further includes a clip bracket mounting plate extending from the clip bracket base, and the clip bracket base is configured to contact a top side of the sensor and the clip bracket mounting plate is configured to contact a rear side of the sensor. In some embodiments, the clip bracket mounting plate includes a clip bracket opening that is configured to receive a clip bracket mounting protrusion that extends outwardly from the rear side of the sensor to secure the clip bracket to the sensor.

In some embodiments, the sensor body includes a connector portion at a first end and a sensor portion extending from the connector portion to a second end, opposite the first end, the connector portion of the sensor body is configured to be removably secured to the connector, and the sensor is attached to a top side of the sensor portion of the sensor body. In some embodiments, a bottom side of the sensor portion of the sensor body, opposite the top side, is configured to be at least partly received within a sensor opening of the bracket body when the sensor assembly is in the second position. In some embodiments, the sensor includes a sensor housing disposed on the top side of the sensor portion of the sensor body and a sensor pad disposed on a bottom side of the sensor portion of the sensor body, opposite the top side. In some embodiments, the sensor assembly includes a first lateral protrusion extending outwardly from a first side of the sensor body and a second lateral protrusion extending outwardly from a second side of the sensor body, opposite the first side, and the first and second lateral protrusions are configured to be received within first and second alignment slots of the bracket body, respectively, as the sensor assembly is rotated from the first position to the second position.

In some embodiments, first and second slot protrusions extend upwardly from the first and second alignment slots, respectively, that are configured to be slidably contacted by the first and second lateral protrusions of the sensor assembly as the sensor assembly is rotated from the first position toward the second position. In some embodiments, the first and second slot protrusions extend upwardly from first sides of the first and second alignment slots, respectively, and, when the sensor assembly is in the second position, the first and second lateral protrusions are configured to contact second sides of the first and second alignment slots, respectively. In some embodiments, the sensor assembly further includes a third lateral protrusion extending outwardly from the first side of the sensor body and a fourth lateral protrusion extending outwardly from the second side of the sensor body, and the third and fourth lateral protrusions are configured to slidably engage first and second ramps of the bracket body, respectively, as the sensor assembly is rotated from the first position toward the second position.

In another aspect, a sensor assembly includes a connector, a sensor body, a sensor attached to the sensor body, and one or more clips. The connector is configured to be removably attached to a bracket body and pivotable about a connector axis relative to the bracket body. The sensor body is configured to be removably coupled to the connector and, when the sensor body is removably coupled to the connector, the sensor body is pivotable with the connector about the connector axis relative to the bracket body. The one or more clips extend outwardly from the sensor body and is configured to engage the bracket body when the sensor body is rotated toward the bracket body to removably secure the sensor assembly to the bracket body. The sensor assembly is configured to be rotatable via the connector between a first position, in which the sensor assembly is at an angle relative to the bracket body, and a second position, in which the sensor assembly is removably secured to the bracket body via the first and second clips.

In still another aspect, a method for installing a sensor assembly onto a bracket body includes pivotably coupling a connector of the sensor assembly with the bracket body, and, with the connector in a first position, coupling a sensor body of the sensor assembly with the connector. The method further includes rotating the sensor assembly toward the bracket body from the first position to a second position, and securing the sensor assembly to the bracket body in the second position.

In yet another aspect, a bracket assembly includes a bracket body and a sensor assembly removably attached to the bracket body. The bracket body includes a pivoting portion that is pivotable relative to the bracket body. The sensor assembly includes a connector configured to be removably attached to the pivoting portion of the bracket body, a sensor body configured to be removably coupled to the connector such that, when the sensor body is removably coupled to the connector, the sensor body is pivotable with the connector relative to the bracket body, a sensor attached to the sensor body, and one or more sensor fasteners extending from the sensor body and configured to removably engage the bracket body. The sensor assembly is rotatable relative to the bracket body via the pivoting portion between a first position, in which the sensor assembly is at an angle relative to the bracket body, and a second position, in which the sensor assembly is removably secured to the bracket body via the one or more sensor fasteners.

In some embodiments, the pivoting portion is integrally formed with the bracket body. In some embodiments, a hinge is integrally disposed between the pivoting portion and the bracket body. In some embodiments, the pivoting portion includes a connector attachment structure configured to removably secure the connector to the pivoting portion in a first direction relative to the pivoting portion and in a second direction relative to the pivoting portion, the second direction being substantially perpendicular to the first direction. In some embodiments, the connector attachment structure includes a connector protrusion configured to secure the connector to the pivoting portion in the first direction, and one or more connector fasteners configured to secure the connector to the pivoting portion in the second direction. In some embodiments, the connector protrusion includes a connector channel configured to receive a portion of the connector. In some embodiments, the one or more sensor fasteners is configured to removably engage one or more fastener protrusions of the bracket body.

In some embodiments, the one or more sensor fasteners includes a first sensor fastener extending outwardly from a first side of the sensor body and a second sensor fastener extending outwardly from a second side of the sensor body, opposite the first sensor fastener. In some embodiments, the first sensor fastener is a first clip configured to removably engage a first fastener protrusion of the bracket body, and the second sensor fastener is a second clip configured to removably engage a second fastener protrusion of the bracket body. In some embodiments, the bracket body includes a first fastener opening and a second fastener opening that extend through the bracket body adjacent to the first and second fastener protrusions, respectively, and, when the sensor assembly is secured to a first side of the bracket body, the first and second clips are configured to be disengaged from the first and second protrusions, respectively, from a second side of the bracket body, opposite the first side, via the first and second fastener openings.

In some embodiments, a sensor opening extends through the bracket body, and the pivoting portion and at least a portion of the sensor body are at least partially received within the sensor opening when the sensor assembly is in the second position. In some embodiments, the bracket body includes first and second alignment slots that are configured to receive first and second lateral protrusions of the sensor body, respectively, as the sensor assembly is rotated from the first position to the second position. In some embodiments, first and second slot protrusions extend upwardly from the first and second alignment slots, respectively, and are configured to be slidably contacted by the first and second lateral protrusions of the sensor body as the sensor assembly is rotated from the first position toward the second position. In some embodiments, the first and second slot protrusions extend upwardly from first sides of the first and second alignment slots, respectively, and, when the sensor assembly is in the second position, the first and second lateral protrusions are configured to contact second sides of the first and second alignment slots, respectively. In some embodiments, the bracket body further includes first and second ramps that are configured to be slidably engaged by third and fourth lateral protrusions of the sensor body, respectively, as the sensor assembly is rotated from the first position toward the second position.

In another aspect, a bracket body is configured to receive a sensor assembly. The bracket body includes a pivoting portion extending from a sensor opening that extends through the bracket body and is configured to removably receive a connector of the sensor assembly, and one or more fastener protrusions extending from the bracket body adjacent to the sensor opening. The pivoting portion is configured to be rotatably moveable between a first position, in which the pivoting portion is at an angle relative to the bracket body, and a second position, in which the pivoting portion is disposed substantially within the sensor opening. The one or more fastener protrusions are configured to, when the connector is removably received by the pivoting portion and a sensor body of the sensor assembly is removably coupled to the connector, be removably engaged by one or more sensor fasteners of the sensor body to removably secure the sensor assembly to the bracket body as the pivoting portion moves from the first position to the second position. In some embodiments, a living hinge is integrally disposed between the pivoting portion and the bracket body.

In some embodiments, the bracket body is configured to be removably secured to a windshield with the sensor assembly adjacent to the windshield.

In still another aspect, a method for installing a sensor assembly onto a bracket body includes securing a connector of the sensor assembly to a pivoting portion of the bracket body, and rotating the pivoting portion toward the bracket body from a first position to a second position to secure the sensor assembly to the bracket body with the pivoting portion and at least a portion of the sensor assembly received within a sensor opening of the bracket body. In some embodiments, the method further includes, prior to rotating the pivoting portion from the first position to the second position, and with the pivoting portion in a first position, coupling a sensor body of the sensor assembly with the connector.

These and other aspects of the bracket assemblies and/or sensor assemblies discussed herein will become more fully understood upon a review of the detailed description, which follows. Other aspects and features will become apparent to those of ordinary skill in the art, upon reviewing the following description of specific examples in conjunction with the accompanying figures. While the following description may discuss various advantages and features relative to certain examples, implementations, and figures, all examples can include one or more of the advantageous features discussed herein. In other words, while this description may discuss one or more examples as having certain advantageous features, one or more of such features may also be used in accordance with the other various examples discussed herein. In similar fashion, while this description may discuss certain examples as devices, systems, or methods, it should be understood that such examples of the teachings of the disclosure can be implemented in various tools, devices, systems, and methods.

DESCRIPTION OF THE DRAWINGS

FIGS. 10 and 11 illustrate an example assembly process of the sensor assembly of FIG. 3 with the bracket assembly of FIG. 1;

FIG. 29 is a top plan view of the second sensor assembly of FIG. 28;

FIG. 30 is a bottom plan view of the second sensor assembly of FIG. 28;

FIG. 31 is a rear-left-top isometric view of the second sensor portion of the bracket body of FIG. 28 with the second sensor assembly removed for clarity;

FIG. 32 is a top plan view of the second sensor portion of the bracket body of FIG. 28;

DETAILED DESCRIPTION

Figure 1:
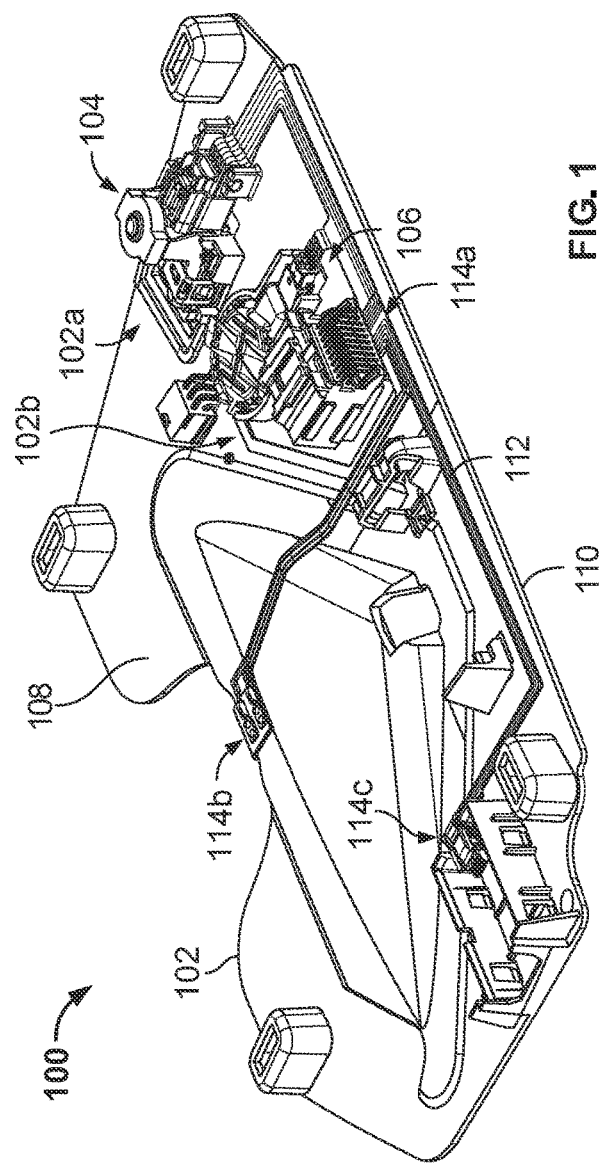
FIG. 1 is a schematic representation of a bracket assembly according to some embodiments of the present disclosure.

Before the embodiments of the disclosure are explained in detail, it is to be understood that the disclosure is not limited in its application to the details of construction and the arrangement of the components set forth in the following description or illustrated in the drawings. The disclosure is capable of other embodiments and of being practiced or being carried out in various ways. Also, it is to be understood that the phraseology and terminology used herein are for the purpose of description and should not be regarded as limiting. The use of "including" and "comprising" and variations thereof is meant to encompass the items listed thereafter and equivalents thereof as well as additional items and equivalents thereof. Throughout the disclosure, the terms "about" and "approximately" mean plus or minus 5% of the number that each term precedes.

As used herein, unless otherwise limited or defined, "substantially parallel" indicates a direction that is within ±5 degrees of a reference direction (e.g., within ±3 degrees), inclusive. For a path that is not linear, the path can be considered to be substantially parallel to a reference direction if a straight line between end-points of the path is substantially parallel to the reference direction or a mean derivative of the path within a common reference frame as the reference direction is substantially parallel to the reference direction. Relatedly, used herein, unless otherwise limited or defined, "substantially perpendicular" indicates a direction that is within ±5 degrees of perpendicular a reference direction (e.g., within ±3 degrees), inclusive. For a path that is not linear, the path can be considered to be substantially perpendicular to a reference direction if a straight line between end-points of the path is substantially perpendicular to the reference direction or a mean derivative of the path within a common reference frame as the reference direction is substantially perpendicular to the reference direction.

Further, unless otherwise limited or defined, "integral" and derivatives thereof (e.g., "integrally") as used herein describe elements that are manufactured as a single piece without fasteners, adhesive, or the like to secure separate components together. For example, an element stamped, cast, or otherwise molded as a single-piece component from a single piece of sheet metal or using a single mold, without rivets, screws, or adhesive to hold separately formed pieces together is an integral (and integrally formed) element. In contrast, an element formed from multiple pieces that are separately formed initially then later connected together, is not an integral (or integrally formed) element.

Turning now to FIG. 1, a bracket assembly 100 is shown, which includes a bracket body 102 and one or more sensor assemblies, such as, e.g., a first sensor assembly 104 and a second sensor assembly 106. In the illustrated example, the first and second sensor assemblies 104, 106 are configured to be connected, e.g., removably attached, to the bracket body 102. More specifically, the bracket body 102 has a first or inner surface 108 and a second or outer surface 110, opposite the inner surface 108, and the sensor assemblies 104, 106 are configured to be removably attached to the inner surface 108 of the bracket body 102. Further, the first sensor assembly 104 is configured to be removably attached to a first sensor portion 102a of the bracket body 102, and the second sensor assembly 106 is configured to be removably attached to a second sensor portion 102b of the bracket body 102.

With continued reference to FIG. 1, an electrical circuit 112 is arranged along the inner surface 108 of the bracket body 102 and provides electrical communication between each of the sensor assemblies 104, 106 and one or more other electrical components, such as, e.g., an electrical hub 114a, a first electrical component 114b, and/or a second electrical component 114c illustrated in FIG. 1. The electrical hub 114a may in turn be in electrical communication with an external electrical component, such as, e.g., a processor configured to receive signals from the first sensor assembly 104 and/or the second sensor assembly 106. In some embodiments, the electrical circuit 112 can be integrally formed with the bracket body 102 such that at least a portion of the electrical circuit 112 extends between the inner and outer surfaces 108, 110 of the bracket body 102.

The first sensor assembly 104 and the first sensor portion 102a of the bracket body 102 are described in connection with FIGS. 3-13 below. Generally, the described embodiment of the first sensor assembly 104 and the first sensor portion 102a allows for an efficient installation and removal of an electrical device (e.g., a sensor, a camera, or any other suitable device) onto or from the bracket body 102. Accordingly, in some embodiments, the bracket body 102 can be configured to receive numerous other components or sensors, such as, e.g., the second sensor assembly 106 and/or the electrical components 114b, 114c, that may each be in electrical communication with the electrical hub 114a via the electrical circuit 112. The second sensor assembly 106 and the second sensor portion 102b of the bracket body 102, although not described and illustrated in detail herein, may be configured generally similar to the first sensor portion 102b and the first sensor assembly 104.

Figure 2:
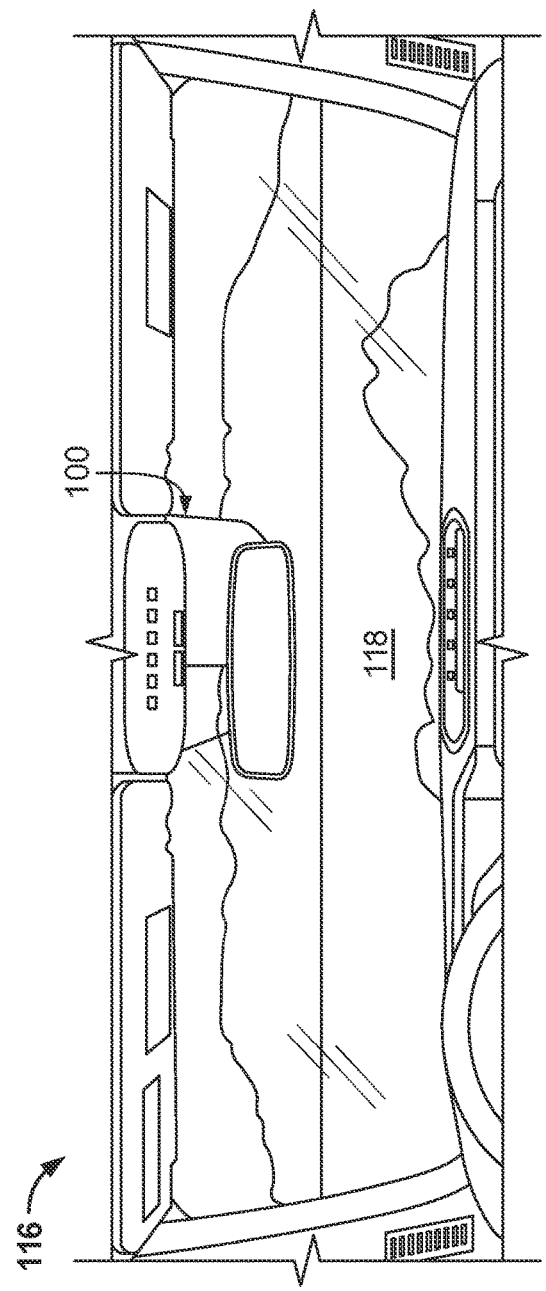
FIG. 2 is a schematic representation of the bracket assembly of FIG. 1 attached to a windshield of a vehicle.

It should be appreciated that the bracket assembly 100 can be utilized in a wide range of applications such as automobiles, aircrafts, security systems, among other uses. FIG. 2 shows one specific exemplary implementation of the bracket assembly 100 utilized in an automobile or vehicle 116. In the illustrated example, the bracket assembly 100 can be attached to an interior surface of a glass 118 (e.g., a windshield) of the vehicle 116 such that the first sensor assembly 104 and/or the second sensor assembly 106 face toward the interior surface of the glass 118, i.e., generally forwardly relative to a forward direction of travel of the vehicle 116. Accordingly, in some embodiments, the bracket assembly 100, and the sensor assemblies 104, 106 attached thereto, can operate as part of, for example, a lane departure warning (LDW) system and/or an automatic emergency braking system of the vehicle 116, among other functionalities.

As briefly described above, in some scenarios, a sensor attached to a bracket body may need to be replaced for one or more reasons, e.g., a malfunction, an inoperable state, to install an improved sensor, etc., or may otherwise need to be accessed and/or removed. However, if the sensor is permanently attached to the bracket body, such as, e.g., with an adhesive, a solder, etc., it may be difficult to remove or replace the sensor without damaging the sensor and/or the bracket body. Further, in such scenarios, when the sensor is removed or replaced, electrical connection components, such as, e.g., an electrical circuit, connected to the sensor can be damaged. Moreover, if one or more components of the bracket body is damaged during removal of a sensor then the entire bracket body may need to be replaced. At least the first sensor assembly 104 shown in FIGS. 3-13 can address one or more of these shortcomings. For example, the bracket body 102 and the first sensor assembly 104 can provide structural features for one or more sensors of the first sensor assembly 104 to be easily replaceable, for the entire first sensor assembly 104 to be removably attachable and easily detachable to the bracket body 102, to align the first sensor assembly 104 within portions of the bracket body 102 during installation of the first sensor assembly 104, and for the first sensor assembly 104 to be firmly fixed on the bracket body 102 when the first sensor assembly 104 is removably attached to the bracket body 102.

Figure 3:
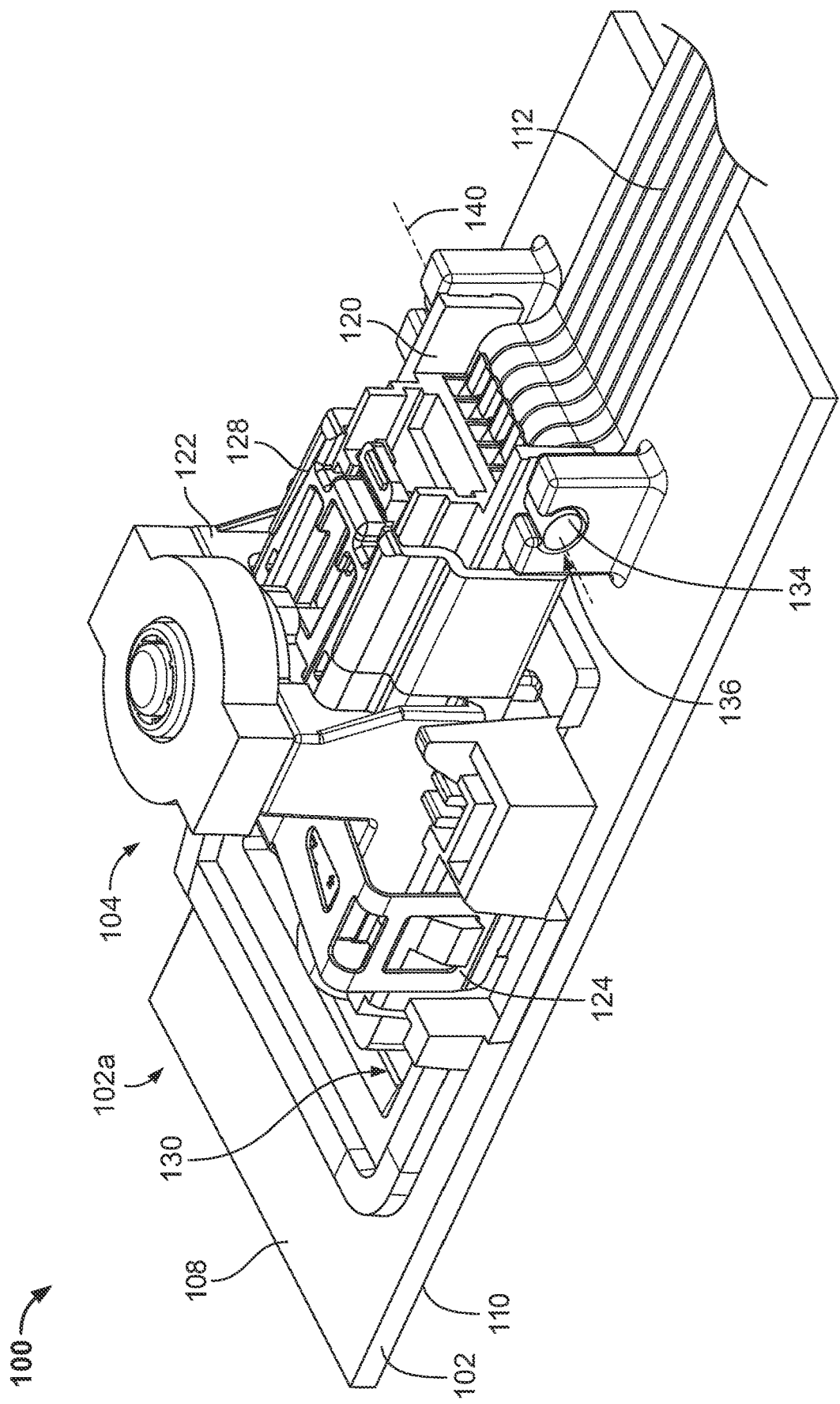
FIG. 3 is a rear-left-top isometric view of a sensor assembly of the bracket assembly of FIG. 1.
Figure 4:
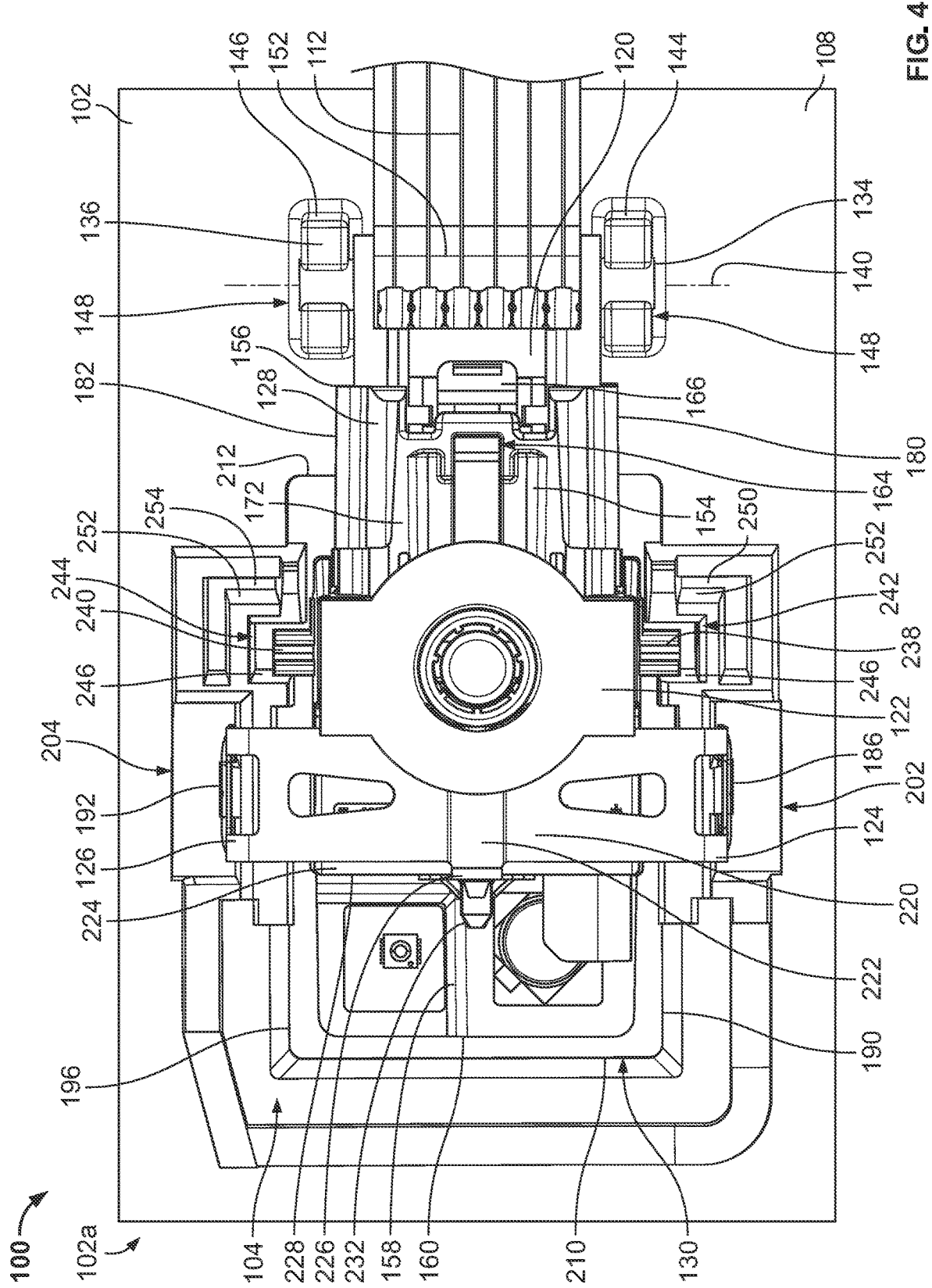
FIG. 4 is a top plan view of the sensor assembly of FIG. 3.

Referring now to FIG. 3, the first sensor assembly 104 includes a connector 120, a sensor 122, and one or more fasteners, such as, e.g., a first fastener 124 and a second fastener 126 (see FIG. 4). The sensor 122 can be attached or integrally formed with a sensor body 128, which can be removably attached to the connector 120. It should be appreciated that while the sensor 122 is described in connection to the sensor body 128, the sensor 122 and the sensor body 128 can be a single-piece unitary component. As discussed in greater detail herein, at least a portion of the sensor 122 of the sensor assembly 104 can be received within a first sensor opening 130 of the first sensor portion 102a of the bracket body 102 that extends through the inner and outer surfaces 108, 110 of the bracket body 102.

Referring to FIGS. 3 and 4, the connector 120 of the first sensor assembly 104 is configured to be removably and pivotably attached to the bracket body 102. More specifically, the connector 120 includes a pivot shaft 134 that is configured to be removably received within a connector receiver 136 of the first sensor portion 102a of the bracket body 102 such that, when the pivot shaft 134 is received by the connector receiver 136, the connector 120 is rotatable or pivotable about a connector axis 140 (see FIG. 3) defined by the pivot shaft 134. In the illustrated embodiment, the connector receiver 136 includes two opposing connector receiver protrusions 144, 146 extending upwardly from the inner surface 108 of the bracket body 102. Each of the connector receiver protrusions 144, 146 include a pivot shaft opening 148 that extend through lateral sides and a top side of the connector receiver protrusions 144, 146.

As shown in FIG. 10, the pivot shaft 134 of the connector 120 of the first sensor assembly 104 can be installed into the pivot shaft openings 148 of each of the connector receiver protrusions 144, 146 by inserting the pivot shaft 134 through the top sides of the connector receiver protrusions 144, 146 in a direction indicated by arrow A of FIG. 10. In some embodiments, the pivot shaft 134 of the connector 120 and the pivot shaft openings 148 of the connector receiver 136 can be configured such that the pivot shaft 134 can be inserted into or removed from the pivot shaft openings 148 only when the connector 120 is in a specific orientation relative to the bracket body 102. For example, in the illustrated embodiment, the pivot shaft openings 148 of the connector receiver 136 have an oblong shape with an elongated body generally corresponding to a shape of the pivot shaft 134 such that the pivot shaft 134 is insertable or removable within the pivot shaft openings 148 only with the connector 120 in a first orientation (as shown in FIG. 10) relative to the bracket body 102. In some embodiments, the first orientation of the connector 120 can be about 90 degrees offset from the bracket body 102. In some embodiments, the first orientation of the connector 120 can be about 45 degrees (see, e.g., FIG. 13) offset from the bracket body 102. In some embodiments, the first orientation of the connector 120 can be in a range of about 20 degrees to about 110 degrees offset from the bracket body 102.

It should be appreciated that the pivot shaft 134 of the connector 120 of the first sensor assembly 104 and the pivot shaft openings 148 of the connector receiver 136 of the first sensor portion 102a of the bracket body 102 can have any other suitable shape, such as, e.g., a circular or polygonal shape. It should also be appreciated that, in some embodiments, the connector 120 can include the pivot shaft openings 148 rather than the pivot shaft 134, and the connector receiver 136 can include the pivot shaft 134 rather than the pivot shaft openings 148.

In the illustrated embodiment, the connector 120 is in electrical connection with the circuit 112. In particular, a flexible portion 152 of the circuit 112 extends from the bracket body 102 to the connector 120. This arrangement of the flexible portion 152 of the circuit 112 connected to the connector 120 can reduce the likelihood of damage to the circuit 112 when the connector 120 is rotated about the connector axis 140. In some embodiments, the connector 120 can include a suitable fastener to fasten the flexible portion 152 of the circuit 112 to the connector 120. In other embodiments, the circuit 112 can be configured such that the connector 120 is in electrical communication with the circuit 112 when the connector 120 is received within the connector receiver 136 or when the connector 120 is rotated to a particular position or one of a plurality of positions. For example, in such embodiments, the circuit 112 can be attached on the connector receiver protrusions 144, 146 of the connector receiver 136 for the connector 120 to be electrically coupled with the circuit 112 when the connector 120 is fastened on the bracket body 102. In other examples, the connector 120 can include electrical contacts (not shown) on a bottom side 176 of the connector 120 that can be configured to be in contact with electrical contacts (not shown) of the circuit 112 disposed on the inner surface 108 of the bracket body 102 when the connector 120 is fastened onto the bracket body 102. However, it should be appreciated that any suitable electrical coupling between the circuit 112 and the connector 120 can be used.

Referring still to FIGS. 3 and 4, the sensor 122 can be electrically coupled with the connector 120 by removably coupling the sensor body 128 with the connector 120 (see FIG. 10). In the illustrated embodiment, the sensor body 128 has an attachment portion 154 at a first end 156 and a sensor portion 158 extending from the attachment portion 154 to a second end 160 of the sensor body, opposite the first end 156. The attachment portion 154 of the sensor body 128 is configured to receive and removably couple to the connector 120 such that the attachment portion 154 is disposed between the connector 120 and the sensor portion 158 of the sensor body 128. Referring specifically to FIG. 3, in the illustrated embodiment, the attachment portion 154 of the sensor body 128 includes an attachment opening or slot 164 that is configured to be operatively engaged by a connector clip 166 of the connector 120 to removably couple the sensor body 128 with the connector 120. It should be appreciated that, in some embodiments, the connector 120 can be configured to receive the sensor body 128. In other embodiments, the connector 120 can include the attachment slot 164 rather than the connector clip 166, and the sensor body 128 can include the connector clip 166 rather than the attachment slot 164. While an exemplary coupling mechanism has been described herein, it is contemplated that any suitable coupling mechanism may be utilized to secure the sensor 122 with the connector 120.

Figure 12:
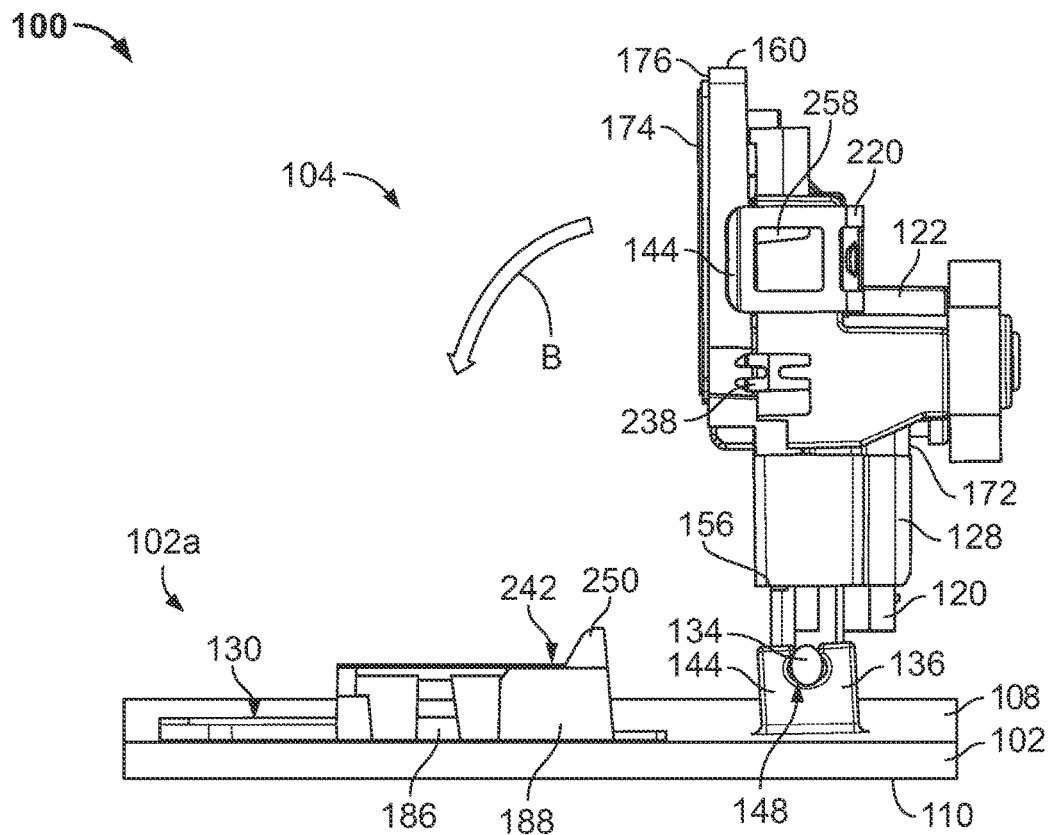
FIG. 12 is a left side view of the sensor assembly of FIG. 3 in a first position.
Figure 13:
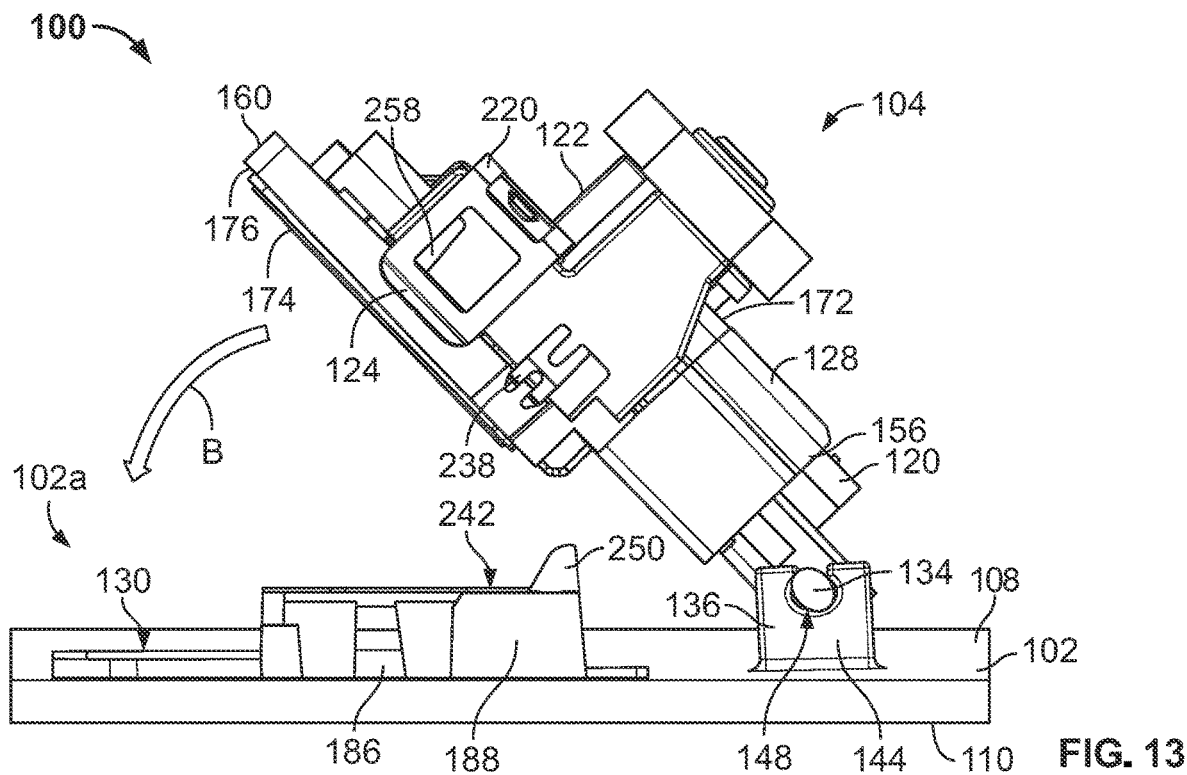
FIG. 13 is a right side view of the sensor assembly of FIG. 3 in a third position.

Referring to FIGS. 12 and 13 with the sensor body 128 removably coupled to the connector 120, the sensor 122 is in electrical communication with the circuit 112 (see FIG. 1) and the sensor body 128 (and the sensor 122 attached thereto) is pivotable with the connector 120 about the connector axis 140 (see FIG. 3) relative to the inner surface 108 of the bracket body 102. Thus, with the connector 120 removably attached to the connector receiver 136 of the bracket body 102 and with the sensor body 128 removably coupled to the connector 120, the entire sensor assembly 104 is rotatable about the connector axis 140 (see FIG. 3) relative to the inner surface 108 of the bracket body 102 between a first position (as shown in FIG. 12) and a second position (as shown in FIGS. 3-9) and a plurality of positions therebetween (e.g., a third position (as shown in FIG. 13)). More specifically, the sensor assembly 104 can be rotated from the first position to the second position by moving the sensor assembly 104 in the direction indicated by arrow B in FIGS. 12 and 13.

With the sensor assembly 104 in the second position, i.e., the installed or secured position, the one or more fasteners 124, 126 can be utilized to removably secure or attach the sensor assembly 104 to the bracket body 102 in the second position. In some embodiments, the connector 120 can be integrally formed with the sensor body 128 such that the entire sensor assembly 104 in pivotably attached to the connector receiver 136 of the bracket body 102 and the flexible portion 152 of the circuit 112 is then attached to the connector 120 of the sensor assembly 104.

Figure 5:
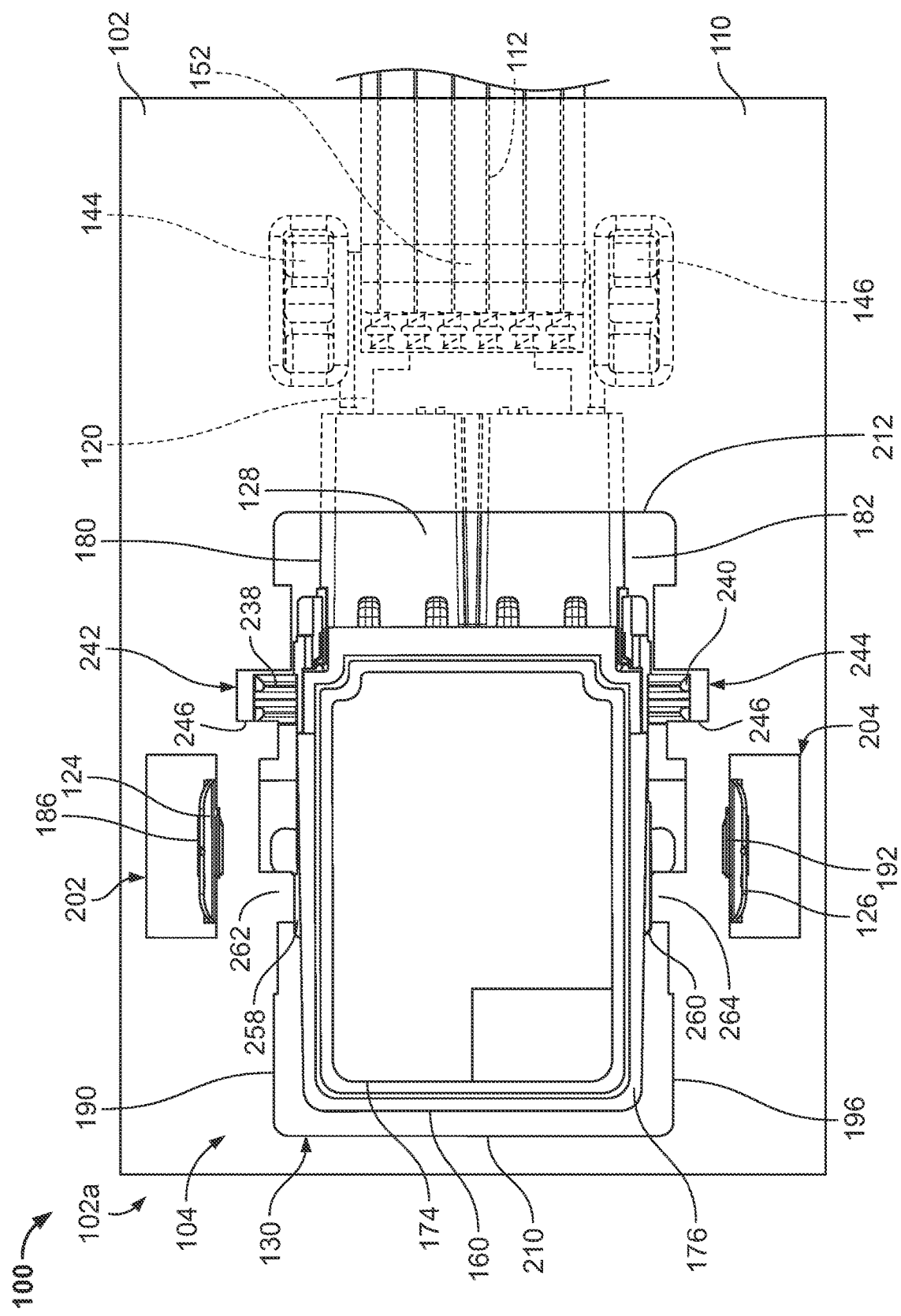
FIG. 5 is a bottom plan view of the sensor assembly of FIG. 3 including hidden lines showing portions of the sensor assembly.
Figure 6:
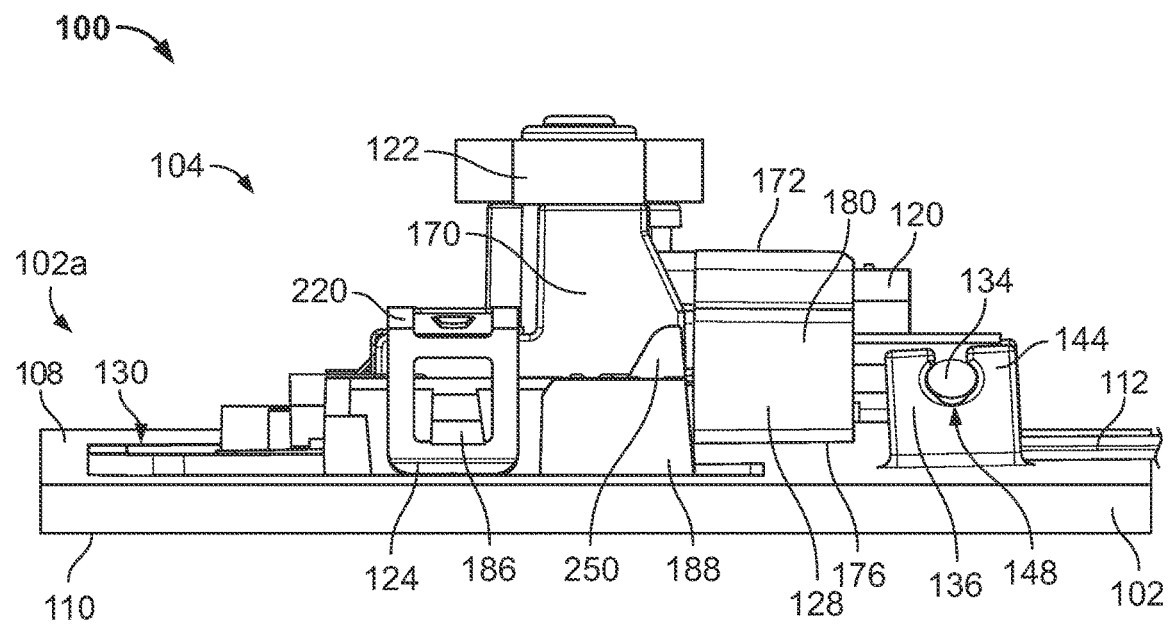
FIG. 6 is a left side view of the sensor assembly of FIG. 3.
Figure 7:
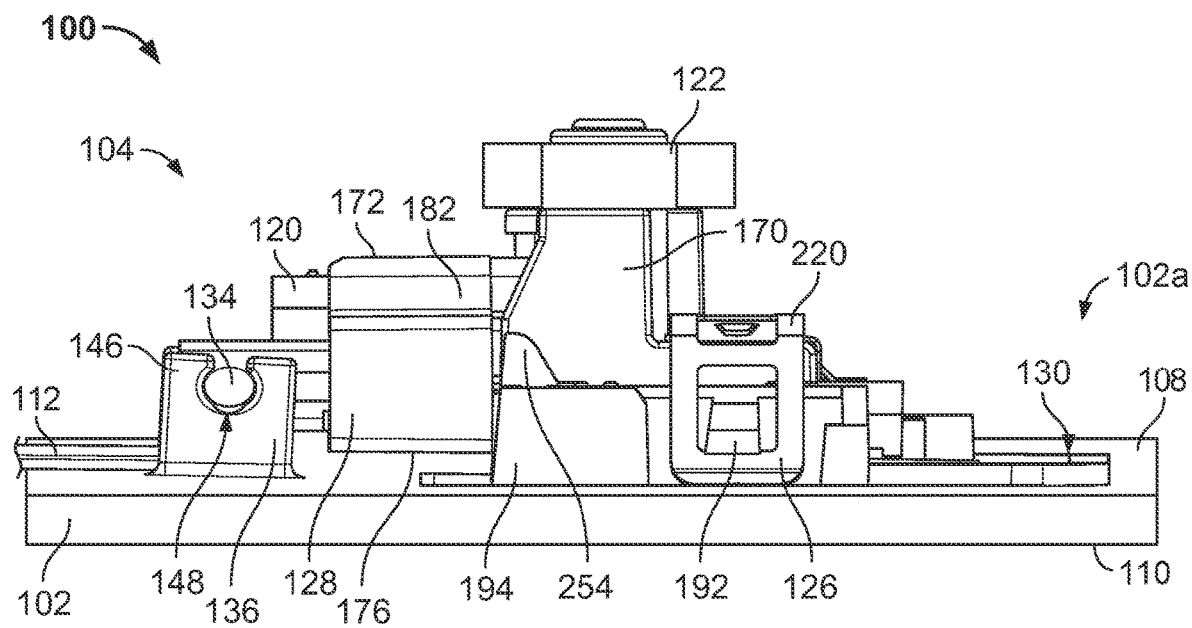
FIG. 7 is a right side view of the sensor assembly of FIG. 3.
Figure 8:
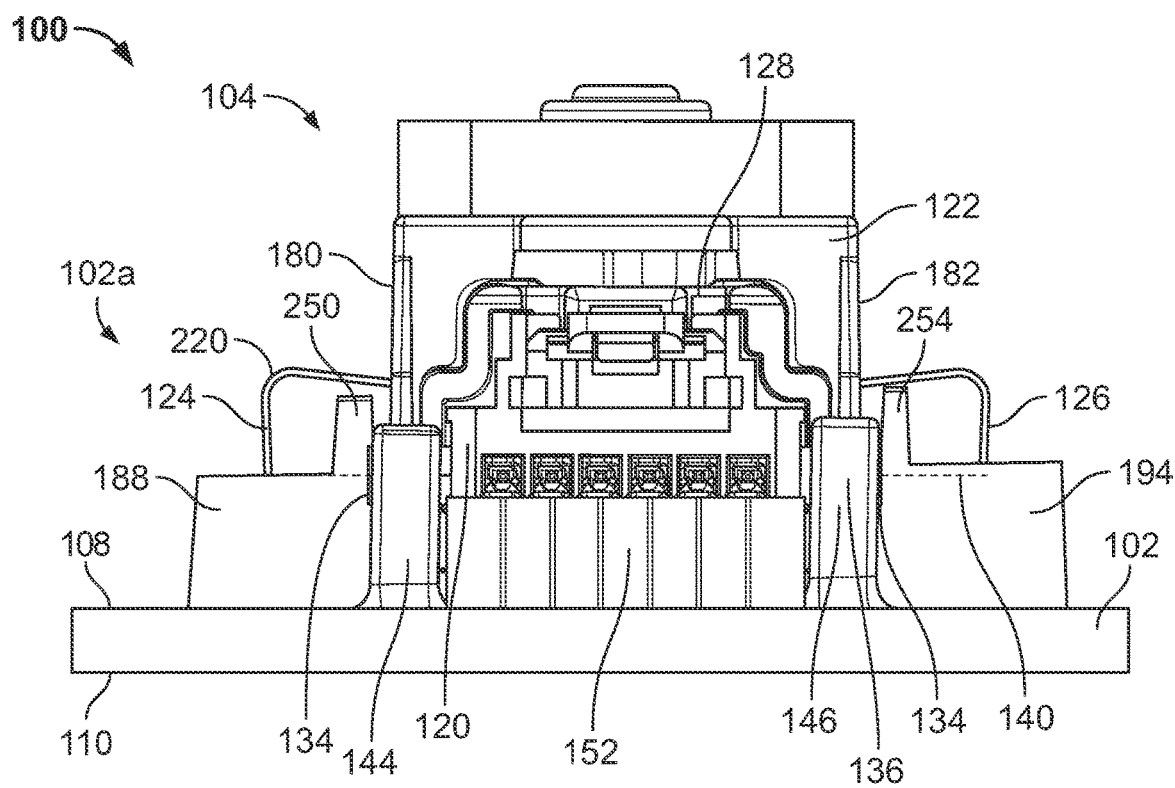
FIG. 8 is a front view of the sensor assembly of FIG. 3.

Referring to FIGS. 5-7, the sensor 122 is attached or coupled to the sensor portion 158 of the sensor body 128. More specifically, the sensor 122 includes a sensor housing 170 attached to atop side 172 of the sensor body 128 along the sensor portion 158 and a sensor pad 174 attached to a bottom side 176 of the sensor body 128 along the sensor portion 158, opposite the top side 172. Thus, with the sensor assembly 104 in the second position (as shown in FIGS. 3-9) at least a portion of the sensor body 128 (e.g., the bottom side 176 of the sensor portion 158) and the sensor pad 174 of the sensor 122 are disposed in the sensor opening 130 of the bracket body 102. In some embodiments, at least the sensor pad 174 can extend through the sensor opening 130 of the bracket body 102 and be aligned with or extend past the outer surface 110 of the bracket body 102. In some embodiments, the sensor pad 174 can include an adhesive outer surface. In some embodiments, the sensor 122 can be pre-assembled with the sensor body 128 and the one or more fasteners 124, 126. In some embodiments, the one or more fasteners 124, 126 can fasten the sensor 122 to the sensor body 128 in addition to fastening the sensor assembly 104 to the bracket body 102 in the second position. It should be appreciated that the sensor 122 can be any suitable sensor to measure or sense a physical property and environment surrounding the sensor 122, such as, e.g., a humidity sensor, temperature sensor, vibration sensor, air-flow sensor, rain sensor, accelerometer sensor, gyroscope sensor, magnetometer, barometer, inertial measurement unit (IMU) sensor, etc.

As briefly described above, the one or more fasteners 124, 126 of the sensor assembly 104 can be configured to removably attach or secure the sensor assembly 104 to the bracket body 102 when the sensor assembly 104 is in the second position (as shown in FIGS. 3-9). In the illustrated embodiment, the one or more fasteners 124, 126 includes a first or left side clip 124 (i.e., the first fastener 124) extending from a first or left side 180 of the sensor body 128 and a second or right side clip 126 (i.e., the second fastener 126) extending from a second or right side 182 of the sensor body 128, opposite the left side 180. In some embodiments, the left and right side clips 124, 126 of the sensor assembly 104 can be attached to the sensor housing 170 of the sensor 122. In some embodiments, the left and right side clips 124, 126 of the sensor assembly 104 can be integrally formed with the sensor body 128 or the sensor housing 170 of the sensor 122.

Referring specifically to FIG. 6, the left side clip 124 of the sensor assembly 104 is configured to engage a first or left side fastener protrusion 186 formed on an outer side of a first or left side sensor opening protrusion 188 of the bracket body 102 that is disposed on a first or left side 190 (see FIG. 5) of the sensor opening 130 of the bracket body 102. Similarly, referring specifically to FIG. 7, the right side clip 126 of the sensor assembly 104 is configured to engage a second or right side fastener protrusion 192 formed on an outer side of a second or right side sensor opening protrusion 194 of the bracket body 102 that is disposed on a second or right side 196 (see FIG. 5) of the sensor opening 130 of the bracket body 102, opposite the left side 190 of the sensor opening 130.

Referring to FIG. 5, in some embodiments, a first or left side clip opening 202 and a second or right side clip opening 204 can extend through the inner and outer surfaces 108, 110 of the bracket body 102 adjacent to the left and right side fastener protrusions 186, 192, respectively, such that a user can disengage the left and right side clips 124, 126 with the left and right side fastener protrusions 186, 192 from the outer surface 110 of the bracket body 102. In some embodiments, the sensor assembly 104 can include three or more fasteners or clips. For example, referring to FIG. 4, a third or front side clip (not shown) can extend from the second end 160 of the bracket body 102 and can be configured to engage a third or front side protrusion (not shown) of the bracket body 102 disposed on a third or rear side 210 of the sensor opening 130, opposite a fourth or front side 212.

Figure 9:
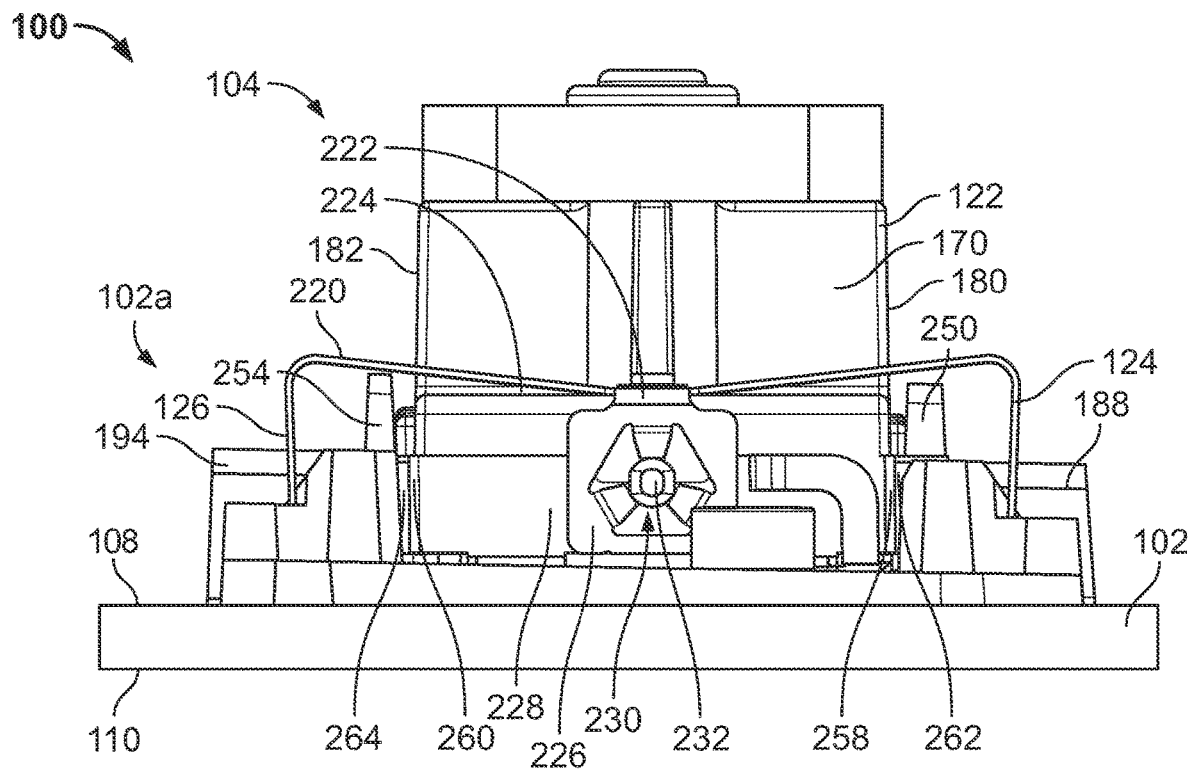
FIG. 9 is a rear view of the sensor assembly of FIG. 3.

Referring to FIGS. 4 and 9, in the illustrated embodiment, the left side and right side clips 124, 126 are integrally formed with a clip bracket 220 that is attached to the sensor housing 170 of the sensor 122. More specifically, the clip bracket 220 includes a clip bracket base 222 disposed on a top side 224 of the sensor housing 170 such that the left side and right side clips 124, 126 extend from opposing sides of the clip bracket base 222. In addition, the clip bracket 220 can further include a clip bracket mounting plate 226 extending at an angle from the clip bracket base 222 adjacent to each of the left side and right side clips 124, 126 that can be configured to contact a front side 228 of the sensor housing 170. Further, a clip bracket opening 230 (see FIG. 9) can extend through the clip bracket mounting plate 226 and can be configured to fixedly receive a clip bracket mounting protrusion 232 extending outwardly from the front side 228 of the sensor housing 170. Thus, with the clip bracket mounting protrusion 232 of the sensor housing 170 received within the clip bracket opening 230 of the clip bracket 220, the clip bracket 220 is removably secured to the sensor housing 170 with the clip bracket base 222 contacting the top side 224 of the sensor housing 170 and the clip bracket mounting plate 226 contacting or engaging the front side 228 of the sensor housing 170.

In some embodiments, the clip bracket mounting plate 226 can include the clip bracket mounting protrusion 232 rather than the clip bracket opening 230, and the sensor housing 170 can include the clip bracket opening 230 rather than the clip bracket mounting protrusion 232. In some embodiments, the sensor housing 170 can include a slot that can receive at least the clip bracket base 222 of the clip bracket 220. In some embodiments, the clip bracket 220 can be coupled to the sensor body 128. In some embodiments, the sensor assembly 104 can include two or more clip brackets 220.

The sensor assembly 104 can include additional structures that can be configured to engage the bracket body 102 to secure or align the sensor assembly 104 relative to the sensor opening 130 of the bracket body 102. For example, referring again to FIG. 4, the sensor housing 170 includes a first or left side lateral protrusion 238 extending from the left side 180 of the sensor body 128 toward the first end 156 of the sensor body 128 and a second or right side lateral protrusion 240 extending from the right side 182 of the sensor body 128 opposite the left side lateral protrusion 238. The left side lateral protrusion 238 is configured to be received within a first or left side alignment slot 242 extending through both a top side and inner side of the left side sensor opening protrusion 188 as the sensor assembly 104 is rotated from the first position toward the second position. Similarly, the right side lateral protrusion 240 is configured to be received within a second or right side alignment slot 244 extending through both a top side and inner side of the right side sensor opening protrusion 194 as the sensor assembly 104 is rotated from the first position toward the second position.

In the illustrated embodiment, the left and right side lateral protrusions 238, 240 are configured to contact a first or rear surface 246 of the left side and right side alignment slots 242, 244, respectively, to align the sensor assembly 104 relative to the sensor opening 130 as the sensor assembly is rotated to the second position (as shown in FIG. 4). Further, the rear surfaces 246 of the left and right side alignment slots 242, 244 can be sloped downwardly toward the inner surface 108 of the bracket body 102 to provide a ramped incline to guide the sensor assembly 104 into alignment with the sensor opening 130 of the bracket body 102. Thus, the left and right side lateral protrusions 238, 240 of the sensor assembly 104 can be configured to slidably contact the left and right side alignment slots 242, 244, respectively, of the bracket body 102 to position the sensor assembly 104 in a front-to-back direction of the sensor opening 130.

Referring specifically to FIGS. 6 and 7, in addition to the sloped rear surfaces 246 of the left and right side alignment slots 242, 244, a first or left side slot protrusion 250 (see FIG. 6) can extend upwardly from the top side of the left side sensor opening protrusion 188 adjacent to a second or front surface 252 of the left side alignment slot 242 and a second or right side slot protrusion 254 (see FIG. 7) can extend upwardly from the top side of the right side sensor opening protrusion 194 adjacent to the front surface 252 of the right side alignment slot 244. The left and right side slot protrusions 250, 254 of the bracket body 102 can include an inclined surface that slopes downwardly toward the left and right side alignment slots 242, 244, respectively, that can be configured to slidably engage the left and right side lateral protrusions 238, 240, respectively, to guide the left and right side lateral protrusions 238, 240 into the left and right side alignment slots 242, 244, respectively, as the sensor assembly 104 is rotated from the first position toward the second position.

Referring specifically to FIGS. 5 and 9, the sensor housing 170 can further include a third (or second left side) lateral protrusion 258 extending from the left side 180 of the sensor assembly 104 between the first lateral protrusion 238 and the second end 160 of the sensor body 128 and a fourth lateral protrusion 260 extending from the right side 182 of the sensor assembly 104 opposite the third lateral protrusion 258. The third lateral protrusion 258 can be configured to slidably contact a first or left side ramp 264 formed on an inner side of the left side sensor opening protrusion 188 adjacent to the left side 190 of the sensor opening 130 of the bracket body 102 as the sensor assembly 104 is rotated from the first position to the second position. Similarly, the fourth lateral protrusion 260 can be configured to slidably contact a second or right side ramp 264 formed on an inner side of the right side sensor opening protrusion 194 adjacent to the right side 196 of the sensor opening 130 of the bracket body 102 as the sensor assembly 104 is rotated from the first position to the second position. Thus, the third and fourth lateral protrusions 258, 260 of the sensor assembly 104 can be configured to slidably contact the left and right side ramps 262, 264, respectively, of the bracket body 102 to position the sensor assembly 104 in a left-to-right side direction of the sensor opening 130.

In some embodiments, the sensor assembly 104 can include five or more alignment protrusions. For example, in some embodiments, a fifth alignment protrusion (not shown) can extend from the second end 160 of the sensor body 128 that can be configured to engage a rear slot or ramp (not shown) of the bracket body 102 disposed adjacent to the rear side 210 of the sensor opening 130 of the bracket body 102. In some embodiments, a bracket alignment protrusion or slot (not shown) can extend along the inner surface 108 of the bracket body 102 between the connector receiver 136 and the front side 212 of the sensor opening 130 that can be configured to receive or be received by a sensor body protrusion or slot (not shown) disposed on the bottom side 176 of the sensor body 128 when the sensor assembly 104 is rotated toward the second position.

In some implementations, devices or systems disclosed herein can be utilized, manufactured, installed, etc. using methods embodying aspects of the invention. Correspondingly, any description herein of particular features, capabilities, or intended purposes of a device or system is generally intended to include disclosure of a method of using such devices for the intended purposes, of a method of otherwise implementing such capabilities, of a method of manufacturing relevant components of such a device or system (or the device or system as a whole), and of a method of installing disclosed (or otherwise known) components to support such purposes or capabilities. Similarly, unless otherwise indicated or limited, discussion herein of any method of manufacturing or using for a particular device or system, including installing the device or system, is intended to inherently include disclosure, as embodiments of the invention, of the utilized features and implemented capabilities of such device or system.

In that regard, aspects of the present disclosure can include methods or processes for installing a sensor assembly. As one example, shown in FIG. 14, a method 300 for installing a sensor assembly onto a bracket body (such as, e.g., the first sensor assembly 104 and the first sensor portion 102a of the bracket body 102 illustrated in FIGS. 1 and 3-13) can include step 310, which can include pivotably coupling a connector of a sensor assembly with a bracket body. For example, with reference to the first sensor assembly 104 and the first sensor portion of the bracket body 102 of FIGS. 1 and 3-13, step 310 of method 300 can include inserting the pivot shaft 134 of the connector 120 into the pivot shaft openings 148 of the connector receiver 136 of the first sensor portion 102a of the bracket body 102 in the direction of arrow A of FIG. 10 to pivotably couple the connector 120 to the bracket body 102 such that the connector 120 is rotatable about the connector axis 140 (see FIG. 3).

With the connector of the sensor assembly pivotably coupled to the bracket body, as in step 310, method 300 can further include step 320, which can include coupling a sensor body of the sensor assembly with the connector in a first position. For example, with reference again to the first sensor assembly 104 and the first sensor portion 102a of the bracket body 102 of FIGS. 1 and 3-13, step 320 of method 300 can include inserting the first end 156 of the sensor assembly 104 onto the connector 120 in the direction of arrow A of FIG. 11 to removably couple the sensor body 128 of the first sensor assembly 104 with the connector 120 such that the first sensor assembly 104 is in the first position (as shown in FIG. 12) and is pivotable about the connector axis 140 (see FIG. 3).

Figure 14:
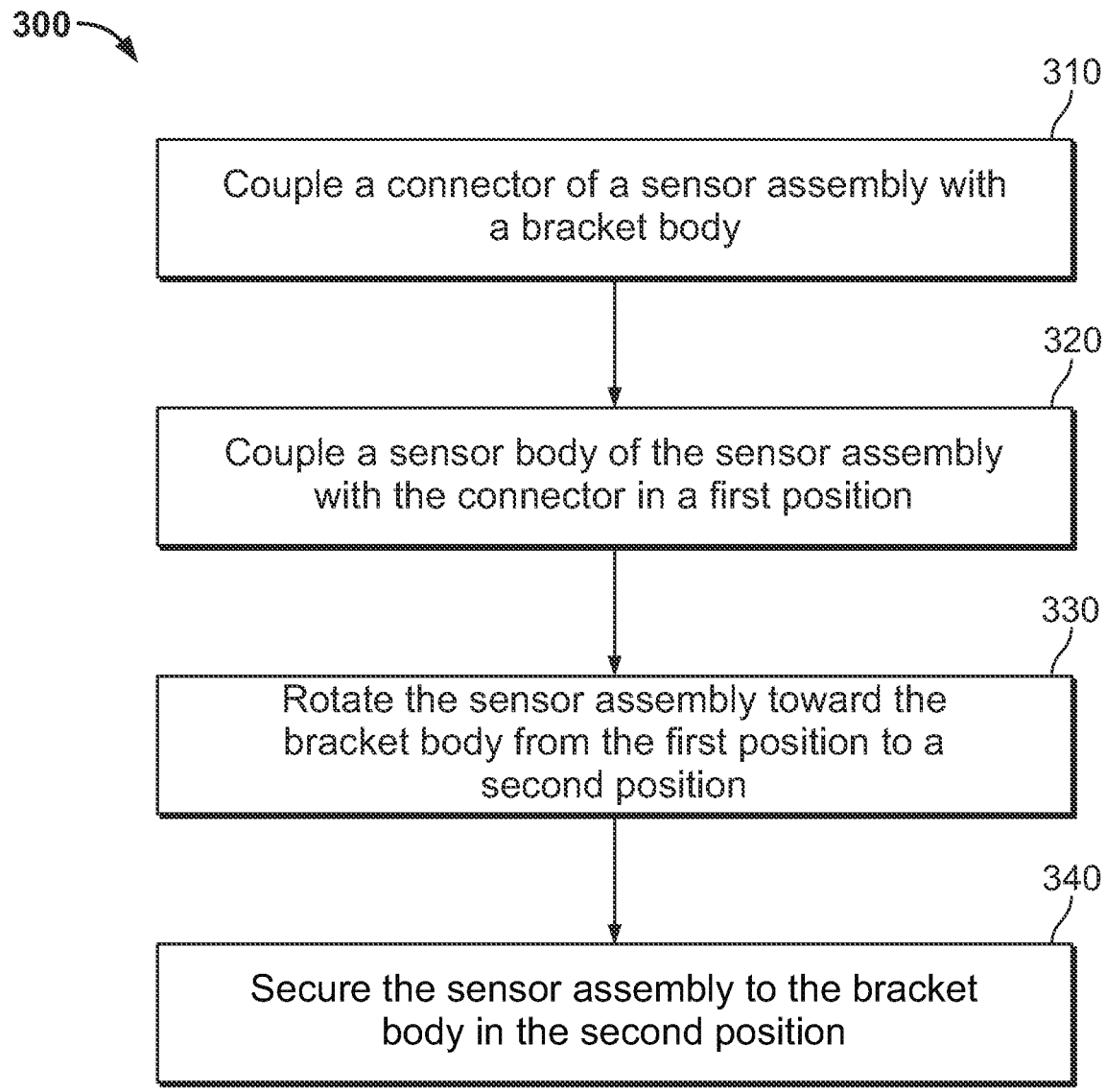
FIG. 14 is a flowchart illustrating an exemplary method of installing a sensor assembly onto a bracket body according to some embodiments of the present disclosure.

Referring still to FIG. 14, with the sensor body coupled to the connector of the sensor assembly, as in step 320, method 300 can further include step 330, which can include rotating the sensor assembly toward the bracket body from the first position to a second position. For example, with reference still to the first sensor assembly 104 and the first sensor portion 102a of the bracket body 102 of FIGS. 1 and 3-13, step 330 of method 300 can include rotating the first sensor assembly 104 in the direction of arrow B (see FIGS. 12 and 13) from the first position (as shown in FIG. 12) to the second position (as shown in FIGS. 3-9).

With the sensor assembly rotated to the second position, as in step 330, method 300 can further include step 340, which can include securing the sensor assembly to the bracket body in the second position. For example, with continued reference to the first sensor assembly 104 and the first sensor portion 102a of the bracket body 102 of FIGS. 1 and 3-13, step 340 of method 300 can include removably engaging the left and right side clips 124, 126 of the first sensor assembly 104 with the left and right side fastener protrusions 186, 192, respectively, of the first sensor portion 102a to secure the first sensor assembly 104 to the bracket body 102 in the second position (as shown in FIGS. 3-9).

In some embodiments, step 330 and step 340 can be combined in that by rotating the sensor assembly to the second position from the first position, as in step 330, can result in the sensor assembly being secured to the bracket body, as in step 340. For example, referring still to the first sensor assembly 104 and first sensor portion 102a of the bracket body 102 of FIGS. 1 and 3-13, the first and second side clips 124, 126 of the first sensor assembly 104 can be configured to removably engage the left and right side fastener protrusions 186, 192 as a result of downward force applied to the first sensor assembly 104 as the first sensor assembly 104 is moved to the second position (as shown in FIGS. 12 and 13).

It is contemplated that a bracket body of a bracket assembly can include an integrally formed pivoting portion to which a sensor assembly can be removably attached such that the pivoting portion and the sensor assembly are pivotable together relative to the remaining portions of the bracket body. In this regard, FIGS. 15-37 depict another exemplary embodiment of a bracket assembly 400, which includes a bracket body 402, a first sensor assembly 404, and a second sensor assembly 406. The bracket assembly 400 is similar to the previous embodiment, with like elements being indicated by similar reference numerals under the "4xx" series and the "5xx" series of reference numerals. For example, the bracket assembly 400 includes the bracket body 402 having a first sensor portion 402a configured to receive the first sensor assembly 404 and a second sensor portion 402b configured to receive the second sensor assembly 406, as indicated by the corresponding dashed lines in FIG. 15, just as the bracket assembly 100 includes the bracket body 402 having the first and second sensor portions 102a, 102b.

Figure 15:
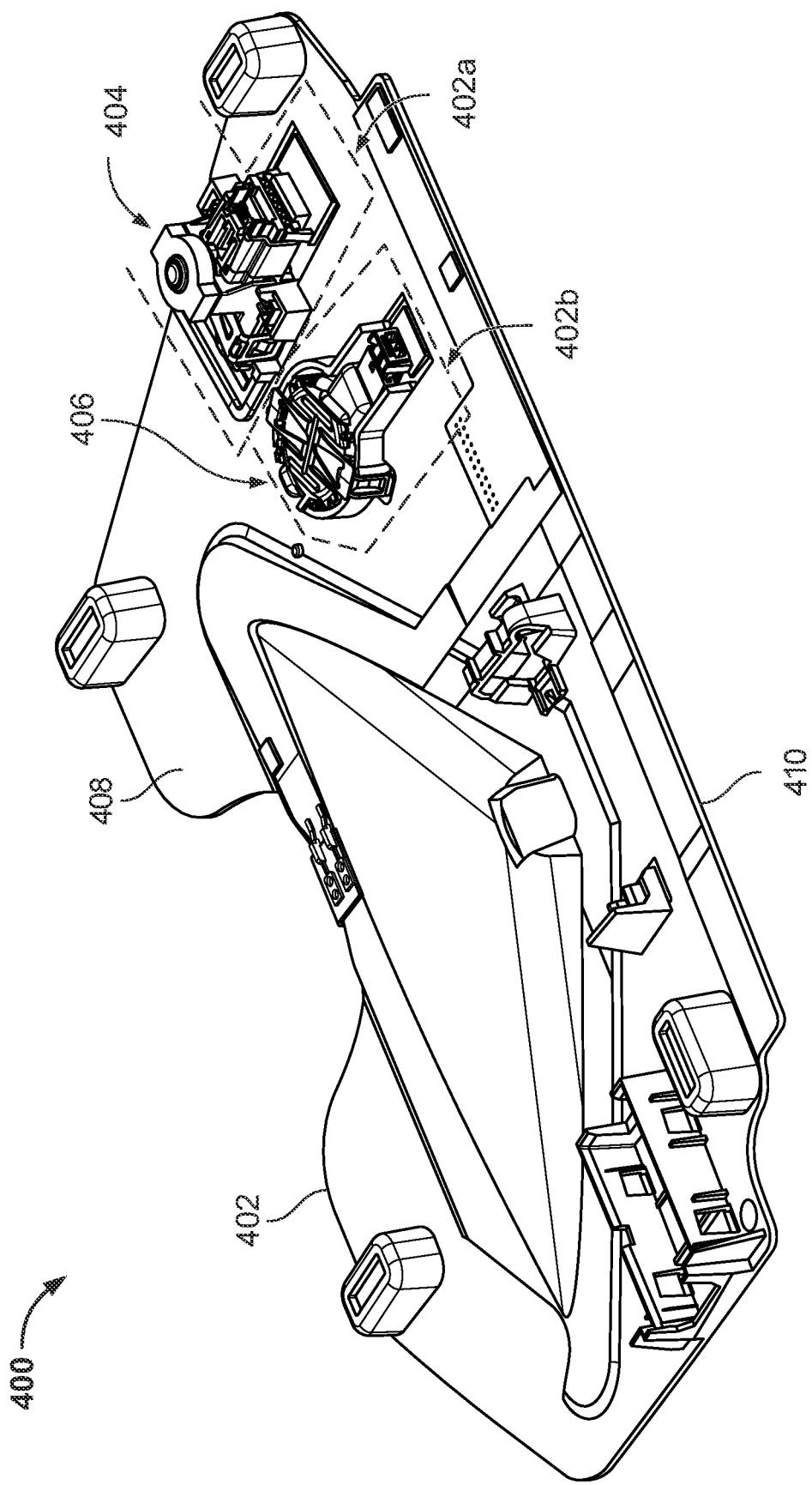
FIG. 15 is a schematic representation of another exemplary bracket assembly according to some embodiments of the present disclosure.

Referring specifically to FIG. 15, the first and second sensor assemblies 404, 406 are configured to be connected, e.g., removably attached, to the bracket body 402. More specifically, the bracket body 402 has a first or inner surface 408 and a second or outer surface 410, opposite the inner surface 408, and the sensor assemblies 404, 406 are configured to be removably attached to the inner surface 408 of the bracket body 402 at the first and second sensor portions 402a, 402b, respectively. In some embodiments, an electrical circuit (not shown) can be disposed along the inner surface 408 of the bracket body 402 to provide electrical communication between the sensor assemblies 404, 406 and an electrical hub (not shown), which may be in electrical communication with an external electrical component (such as, e.g., a processor configured to receive signals from the sensor assemblies 404, 406). In some embodiments, an electrical circuit can be integrally formed with the bracket body 402 such that at least a portion of the electrical circuit extends between the inner and outer surfaces 408, 410 of the bracket body 402. The first and second sensor assemblies 404, 406 are described in connection with FIGS. 16-27 and 28-37, respectively, below.

Figure 17:
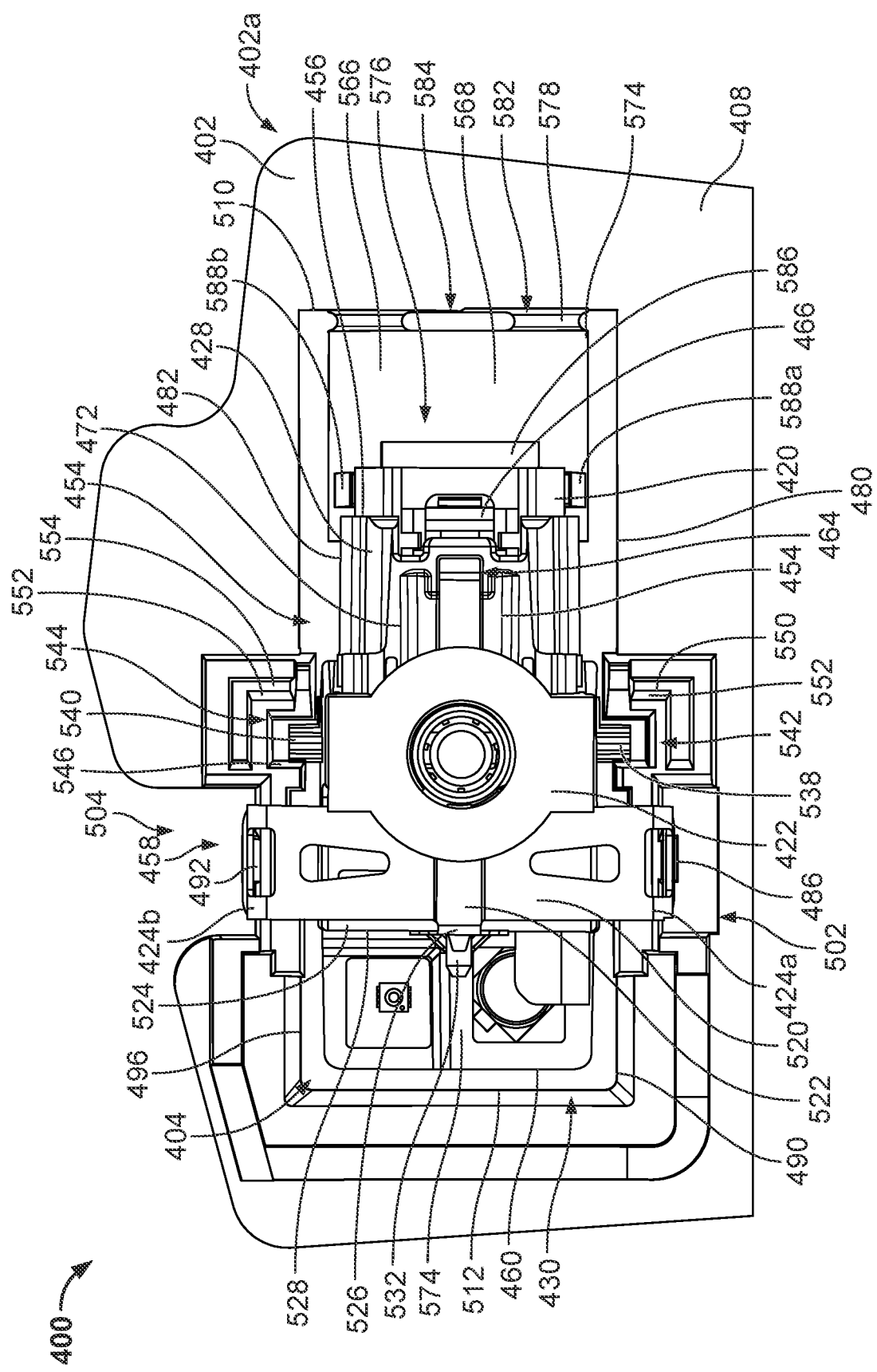
FIG. 17 is a top plan view of the first sensor assembly of FIG. 16.

Referring again to FIG. 15, the first sensor assembly 404 includes a connector 420, a first sensor 422, and one or more sensor fasteners 424, such as, e.g., a first sensor fastener 424a and a second sensor fastener 424b (see FIG. 17). The first sensor 422 can be attached or integrally formed with a sensor body 428, which can be removably attached to the connector 420. It should be appreciated that that while the first sensor 422 is described in connection to the sensor body 428, the first sensor 422 and the sensor body 428 can be a single-piece unitary component. As discussed in greater detail herein, the first sensor assembly 404 can be pivotably moveable relative to the bracket body 402 such that, when the first sensor assembly 404 is in an installed position, at least a portion of the first sensor 422 can be received within a first sensor opening 430 of the first sensor portion 402a that extends through the inner and outer surfaces 408, 410 of the bracket body 402.

Figure 16:
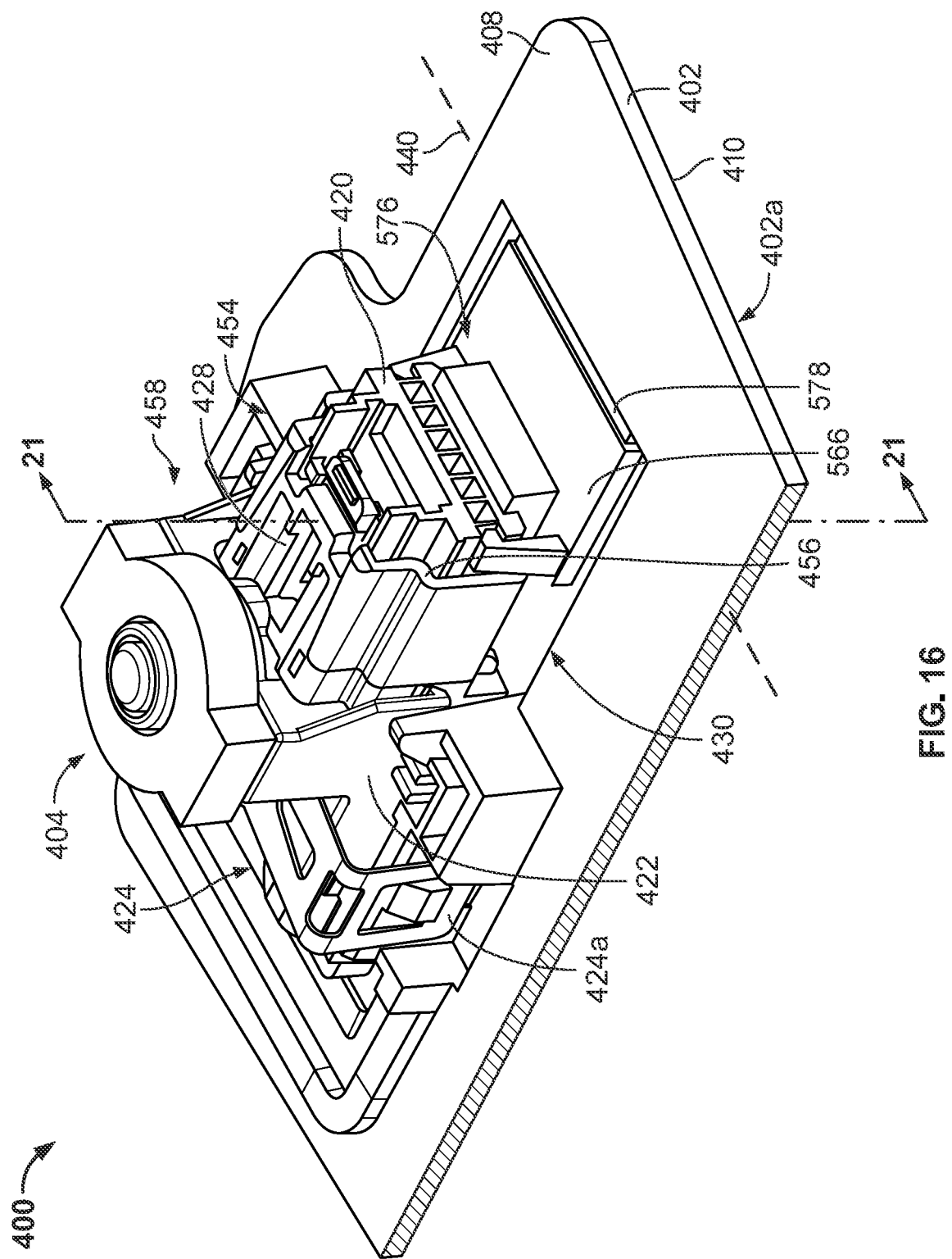
FIG. 16 is a rear-left-top isometric view of a first sensor assembly attached to a first sensor portion of a bracket body of the bracket assembly of FIG. 15.
Figure 18:
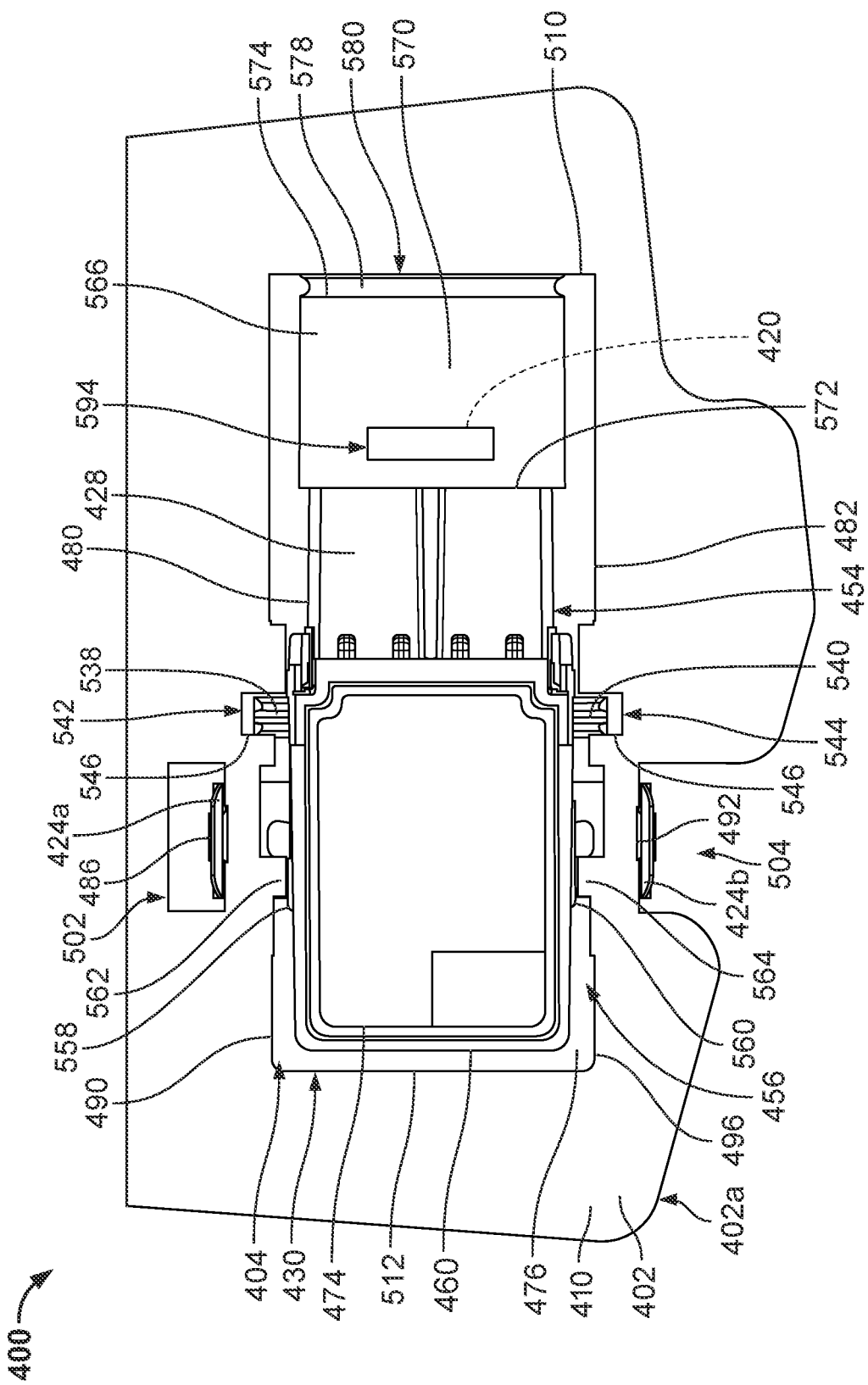
FIG. 18 is a bottom plan view of the first sensor assembly of FIG. 16.
Figure 22:
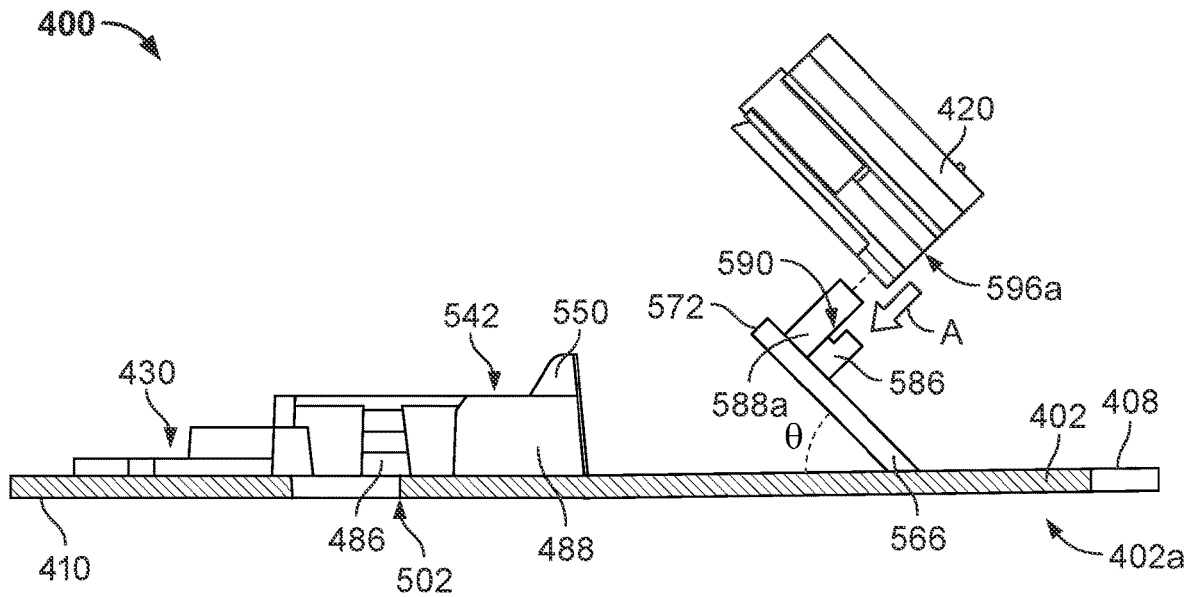
FIG. 22 illustrates a first step in an example assembly process of the first sensor assembly and the first sensor portion of the bracket body of FIG. 16.
Figure 23:
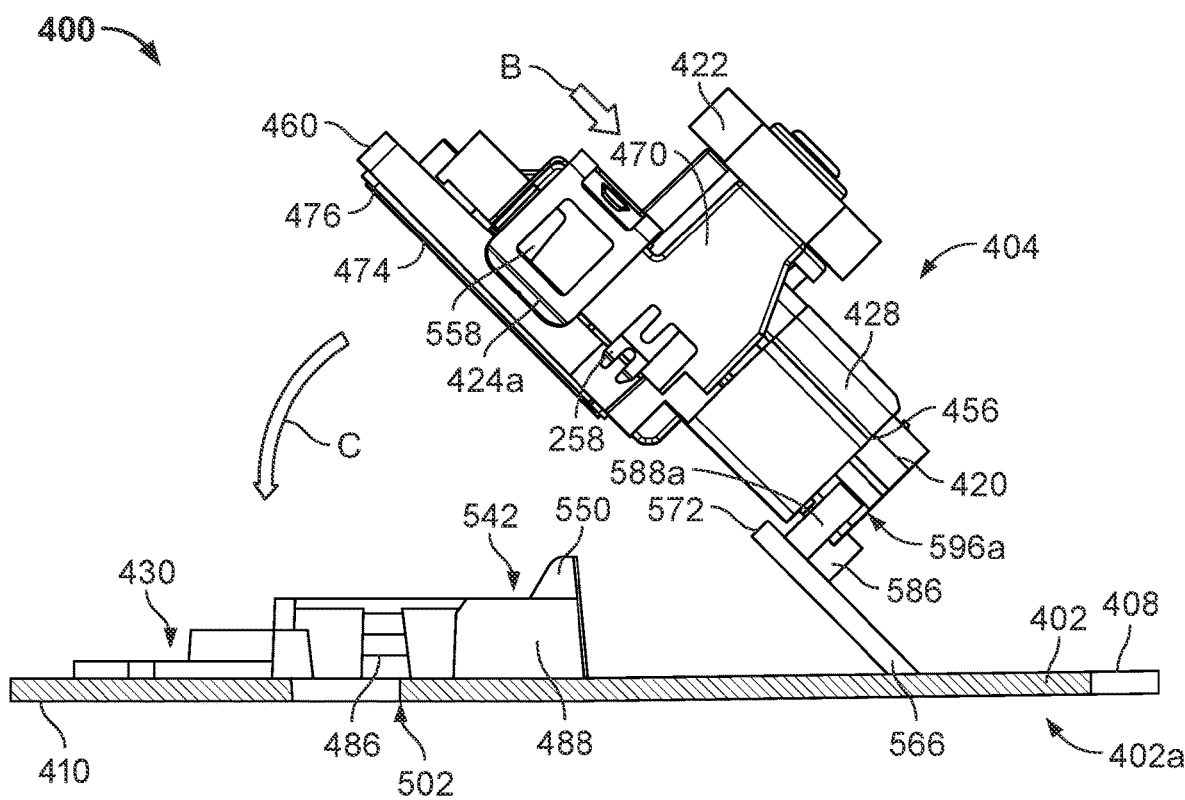
FIG. 23 illustrates a second step in the example assembly process of the first sensor assembly and the first sensor portion of the bracket body of FIG. 16.

Referring to FIGS. 16-18, the first sensor 422 can be electrically coupled with the connector 420 by removably coupling the sensor body 428 with the connector 420 (see, e.g., FIGS. 22 and 23). In the illustrated embodiment, the sensor body 428 has an attachment portion 454 at a first end 456 (see FIGS. 16 and 17) and a sensor portion 458 extending from the attachment portion 454 to a second end 460 (see FIGS. 17 and 18) of the sensor body 428, opposite the first end 456. The attachment portion 454 of the sensor body 428 is configured to receive and removably couple to the connector 420 such that the attachment portion 454 is disposed between the connector 420 and the sensor portion 458 of the sensor body 428. Referring specifically to FIG. 16, in the illustrated embodiment, the attachment portion 454 of the sensor body 428 includes an attachment opening or slot 464 that is configured to be operatively engaged by a connector clip 466 of the connector 420 to removably couple the sensor body 428 with the connector 420. It should be appreciated that, in some embodiments, the connector 420 can be configured to receive the sensor body 428. In other embodiments, the connector 420 can include the attachment slot 464 rather than the connector clip 466, and the sensor body 428 can include the connector clip 466 rather than the attachment slot 464. While an exemplary coupling mechanism has been described herein, it is contemplated that any suitable coupling mechanism may be utilized to secure the first sensor 422 with the connector 420.

Figure 19:
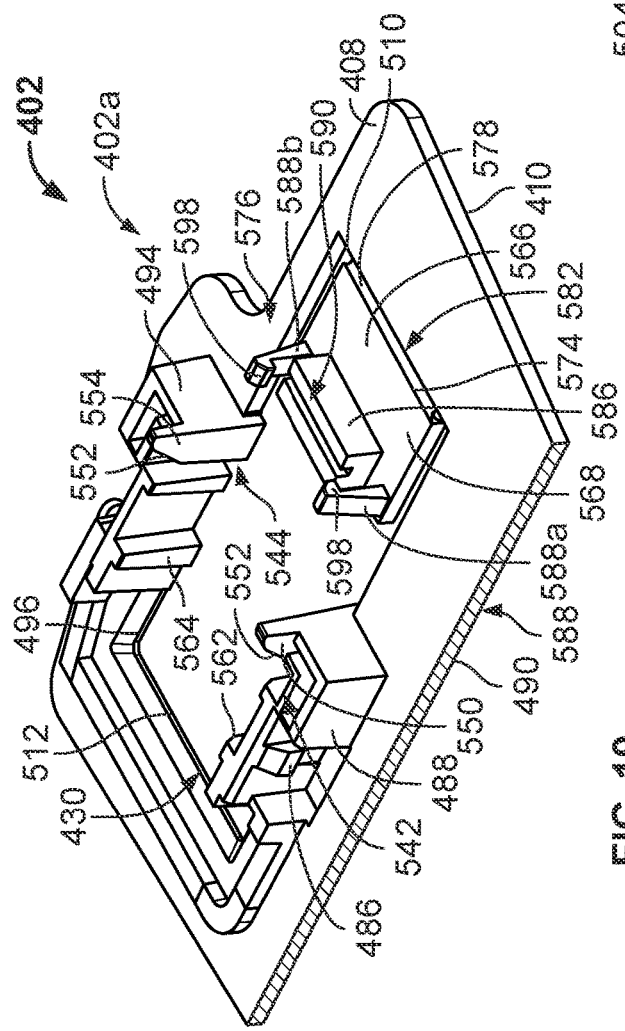
FIG. 19 is a rear-left-top isometric view of the first sensor portion of the bracket body of FIG. 16 with the first sensor assembly removed for clarity.
Figure 20:
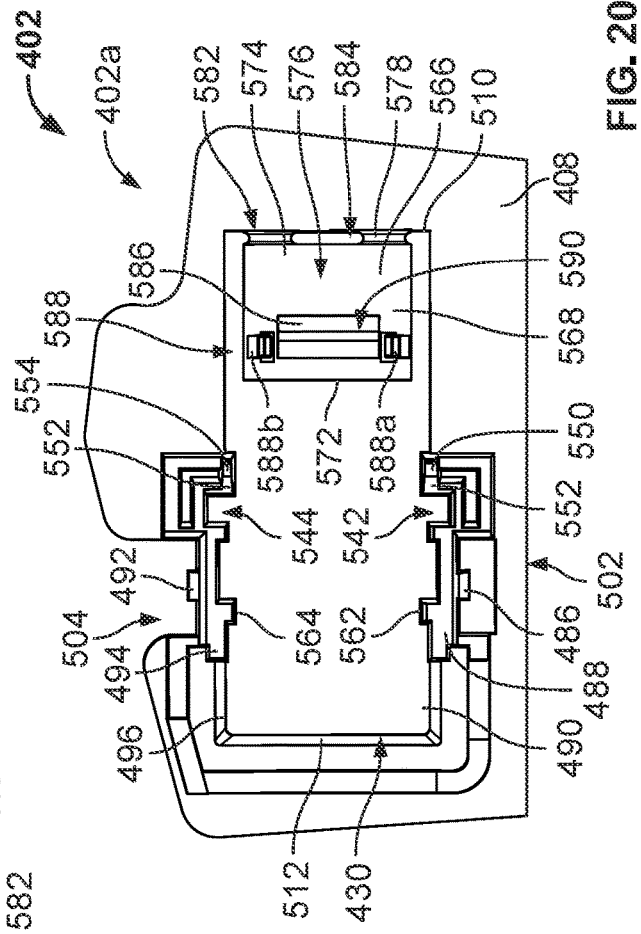
FIG. 20 is a top plan view of the first sensor portion of the bracket body of FIG. 19.

Referring to FIGS. 19 and 20, the first sensor portion 402a of the bracket body 402 has a first pivoting portion 566 that is configured to removably receive at least a portion of the first sensor assembly 404, such as, e.g., the connector 420. More specifically, in the illustrated embodiment, the first pivoting portion 566 has a first or inner surface 568, a second or outer surface 570, opposite the inner surface 568, a first or front side 572, a second or rear side 574, opposite the front side 572, and a connector attachment structure 576 extending from the inner surface 568. The first pivoting portion 566 of the bracket body 402 is configured to be pivotable about a pivot axis 440 (see FIG. 16) relative to the bracket body 402.

In particular, the rear side 574 of the first pivoting portion 566 is attached to a hinge 578 arranged along a first or rear end 510 of the sensor opening 430, opposite a second or front end 512, such that the first pivoting portion 566 is pivotable relative to the bracket body 402 and within the first sensor opening 430 between a first position (as shown in FIGS. 22 and 23), in which the first pivoting portion 566 is at an angle θ (see FIG. 22) relative to the inner surface 408 of the bracket body 402, and a second position (as shown in FIGS. 15-21 and 24-27), in which the first pivoting portion 566 is disposed substantially within the first sensor opening 430. In some embodiments, the connector attachment structure 576 of the first pivoting portion 566 can be configured to removably receive at least a portion of the sensor body 428 of the first sensor assembly 404. In some embodiments, the connector attachment structure 576 of the first pivoting portion 566 can be configured to receive a portion of the sensor body 428 rather than the connector 420.

Figure 21:
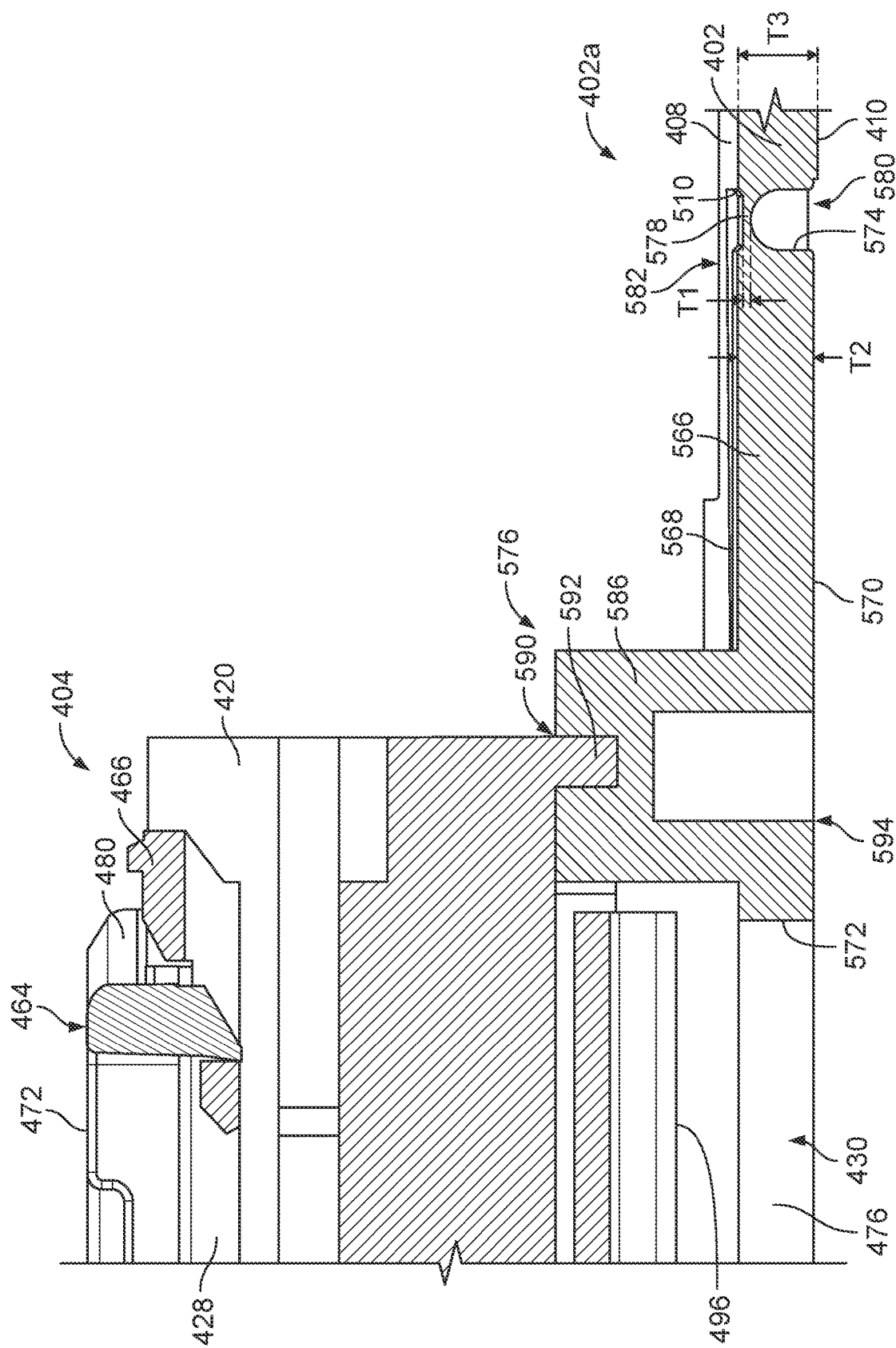
FIG. 21 is a partial cross-sectional view taken along line 21-21 of FIG. 16.

With the first pivoting portion 566 in the second position (as shown in FIGS. 15-21 and 24-27), the inner and outer surfaces 568, 570 of the first pivoting portion 566 are substantially aligned with the inner and outer surfaces 408, 410 of the bracket body 402, respectively (see, e.g., FIG. 21). In some embodiments, at least the inner surface 568 of the first pivoting portion 566 can be substantially aligned with the inner surface 408 of the bracket body. In some embodiments, with the first pivoting portion 566 in the second position, the first pivoting portion 566 can be disposed entirely within the first sensor opening 430 and an angle relative to the inner surface 408 of the bracket body 402. In some embodiments, with the first pivoting portion 566 in the first position (as shown in FIG. 22), the angle θ, measured from the inner surface 408 of the bracket body 402 to the outer surface 570 of the first pivoting portion 566, can be in a range of between about 5 degrees and about 120 degrees, in a range of between about 10 degrees and about 105 degrees, in a range of between about 12 degrees and about 90 degrees, or in a range of between about 15 degrees and about 45 degrees.

Referring again to FIGS. 19 and 20, in the illustrated embodiment, the first pivoting portion 566 is integrally formed with the bracket body 402 and the hinge 578 is an integral hinge (i.e., a "living hinge" as known in the art). More specifically, the hinge 578 extends integrally from the rear end 510 of the first sensor opening 430 and into the first sensor opening 430 between the inner and outer surfaces 408, 410 of the bracket body 402 and integrally connects the rear side 574 of the first pivoting portion 566 with the bracket body 402 at the rear end 510 of the first sensor opening 430. In some embodiments, the hinge 578 of the bracket body 402 can be formed of a first material and the bracket body 402 and/or the first pivoting portion 566 can be formed of a second material that is different than the first material. In some embodiments, the hinge 578, the bracket body 402, and the first pivoting portion 566 can be formed of the same material. In some embodiments, the hinge 578 can be formed by mating structures of the first pivoting portion 566 and the bracket body 402. For example, in some embodiments, the hinge 578 may include one or more posts (not shown) extending from sides of the first pivoting portion 566 that are pivotably received within one or more apertures defined in the bracket body 402 adjacent to the first sensor opening 430, or vice versa. In some such embodiments, the first pivoting portion 566 can be removably attached to the bracket body 402.

Referring to FIG. 21, the hinge 578 of the bracket body 402 defines the pivot axis 440 (see FIG. 16) and is generally configured to permit rotation of the first pivoting portion 566 between the first and second positions. In the illustrated embodiment, the hinge 578 is integrally formed with the bracket body 402 with a first or outer hinge channel 580 formed between the outer surface 410 of the bracket body 402 and the outer surface 570 of the first pivoting portion 566 and a second or inner hinge channel 582 formed between the inner surface 408 of the bracket body 402 and the inner surface 568 of the first pivoting portion 566. Thus, the hinge 578 has a first thickness T1 formed by the inner and outer hinge channels 580, 582 that is less than both a second thickness T2 of the first pivoting portion 566 and a third thickness T3 of the bracket body 402 adjacent to the hinge 578. In some embodiments, the first thickness T1 of the hinge 578 can be in a range of between about 5% and about 85%, in a range of between about 10% and about 70%, in a range of between about 15% and about 50%, or in a range of between about 20% and about 40% of the third thickness T3 of the bracket body 402.

In the illustrated embodiment, the outer hinge channel 580 has a first depth (i.e., as measured from the outer surface 410 of the bracket body 402 and/or the outer surface 570 of the first pivoting portion 566 to an outer surface of the hinge 578 defined along the outer hinge channel 580) that is greater than a second depth of the inner hinge channel 582 (i.e., as measured from the inner surface 408 of the bracket body 402 and/or the inner surface 568 of the first pivoting portion 566 to an inner surface of the hinge 578 defined along the inner hinge channel 582). In some embodiments, the second depth of the inner hinge channel 582 can be in a range of about 5% to about 75%, in a range of about 10% to about 60%, in a range of about 12% to about 50%, or in a range of about 20% to about 35% of the first depth of the outer hinge channel 580. In some embodiments, a hinge opening 584 (see FIG. 17) can extend through the outer and inner hinge channels 580, 582 that can be configured to reduce strain on the hinge 578 as the first pivoting portion 566 is rotated between the first and second positions.

Referring to FIGS. 22 and 23, the connector attachment structure 576 is configured to receive and removably secure the connector 420 to the first pivoting portion 566 in one or more directions relative to the first pivoting portion 566. In the illustrated embodiment, the connector attachment structure 576 includes a connector protrusion 586 configured to secure the connector 420 in a first direction, such as, e.g., as generally indicated by arrow B in FIG. 23, relative to the first pivoting portion 566 and one or more connector fasteners 588 configured to secure the connector 420 in a second direction that is substantially perpendicular to the first direction, such as, e.g., as generally indicated by arrow A in FIG. 22.

Referring again to FIG. 21, when the connector 420 is received by the connector attachment structure 576, the connector protrusion 586 is configured to engage a portion of the connector 420 and the one or more connector fasteners 588 is configured to engage another portion of the connector 420. In the illustrated embodiment, the connector protrusion 586 defines a connector recess 590 that can be configured to receive a flange 592 of the connector 420 and prevents movement of the connector 420 in the first direction relative to the first pivoting portion 566. In some embodiments, the connector protrusion 586 can be configured to be received within a connector recess (not shown) of the connector 420. In some embodiments, the connector recess 590 can be defined along the inner surface 568 of the first pivoting portion 566. In some embodiments, the connector attachment structure 576 of the first pivoting portion 566 can include two or more connector protrusions and/or connector recesses. In some embodiments, the first pivoting portion 566 can include an attachment structure recess 594 defined along the outer surface 570 of the first pivoting portion 566 and extending into the connector protrusion 586 opposite the connector recess 590 that can be configured to improve structural characteristics of the connector protrusion 586 when the bracket body 402 is formed via a particular manufacturing process, such as, e.g., injection molding.

Referring again to FIGS. 17 and 18, in the illustrated embodiment, the one or more connector fasteners 588 includes a first connector fastener 588a and a second connector fastener 588b that are configured to engage a first connector channel 596a and a second connector channel 596b (see FIG. 26), respectively, of the connector 420. In the illustrated embodiment, the first and second connector fasteners 588a, 588b extend from the inner surface 568 of the first pivoting portion 566 on opposing sides of the connector protrusion 586. Each of the connector fasteners 588a, 588b have a connector fastener protrusion 598 (see FIG. 26) defined along an upper end thereof configured to be received within the first and second connector channels 596a, 596b (see FIG. 26) of the connector 420 and can prevent movement of the connector 420 in the second direction relative to the first pivoting portion 566. In some embodiments, the connector fasteners 588a, 588b can be included on the connector 420 rather than the first pivoting portion 566 and the connector channels 596a, 596b can be defined by the first pivoting portion 566 rather than the connector 420, such as, e.g., along opposing sides of the connector protrusion 586. In some embodiments, the connector attachment structure 576 can include three or more connector fasteners 588. For example, in some such embodiments, the connector attachment structure 576 can include one connector protrusion 586 and four connector fasteners 588.

As shown in FIG. 22, the connector 420 can be installed to the connector attachment structure 576 of the first pivoting portion 566 by inserting the connector 420 in between the first and second connector fasteners 588a, 588b in the first direction indicated by arrow A of FIG. 22 until the flange 592 (see FIG. 21) of the connector 420 is received within the connector recess 590 of the connector protrusion 586 (as shown in FIG. 21). In some embodiments, the connector fasteners 588a, 588b can be configured to elastically deform outwards relative to the connector protrusion 586 as the connector 420 is inserted between the connector fastener protrusions 598 (see FIG. 13) of the first and second connector fasteners 588a, 588b and to return to their original shape once the connector fastener protrusions 598 are aligned with the first and second connector channels 596a, 596b (see FIG. 26) of the connector 420. In some embodiments, at least one of the first and second connector fasteners 588a, 588b can be configured to be laterally moveable along the inner surface 568 of the first pivoting portion 566 relative to the connector protrusion 586. In some such embodiments, the at least one of the connector fasteners 588a, 588b can be biased toward the connector protrusion 586, such as, e.g., by a spring. While an exemplary coupling mechanism has been described herein, it is contemplated that any suitable coupling mechanism may be utilized to secure (e.g., removably) the connector 420 with the first fastening portion 566.

In some embodiments, the connector 420 can be placed in electrical connection with an electrical circuit (not shown) of the bracket assembly 400 prior to or following attachment of the connector 420 to the first pivoting portion 566. For example, in some embodiments, an electrical circuit of the bracket assembly 400 can be disposed along the inner surface 408 of the bracket body 402 and a first circuit connector (not shown) of the electrical circuit can be coupled to the connector 420 when the connector 420 is secured to the first pivoting portion 566 by the connector attachment structure 576. In some such embodiments, the first circuit connector of the electrical circuit can include a flexible portion (not shown) that extends from the bracket body 402 to the connector 420, which can reduce the likelihood of damage to the electrical circuit when the connector 420 is rotated about the pivot axis 440.

In some embodiments, the connector 420 can include a suitable fastener to fasten the flexible portion of the electrical circuit to the connector 420. In other embodiments, the electrical circuit can be configured such that the connector 420 is in electrical communication with the electrical circuit when the connector 420 is secured to the first pivoting portion 566 or when the first pivoting portion 566 with the connector 420 is rotated to a particular position or plurality of positions. For example, in such embodiments, the connector 420 can include electrical contacts (not shown) on a bottom side of the connector 420 (such as, e.g., adjacent to the flange 592) that can be configured to be in contact with electrical contacts (not shown) of the electrical circuit disposed on the inner surface 568 of the first pivoting portion 566 (such as e.g., within the connector recess 590 of the connector protrusion 586) when the connector 420 is secured to the first pivoting portion 566. It should be appreciated that any suitable electrical coupling between an electrical circuit of the bracket assembly 400 and the connector 420 can be used.

Referring specifically to FIG. 23, with the sensor body 428 removably coupled to the connector 420, the sensor body 428 (and the first sensor 422 attached thereto) is pivotable with the connector 420 about the pivot axis 440 (see FIG. 16) relative to the inner surface 408 of the bracket body 402. Thus, with the connector 420 removably attached to the first pivoting portion 566 and the sensor body 428 removably coupled to the connector 420, the entire first sensor assembly 404 is rotatable about the pivot axis 440 relative to the inner surface 408 of the bracket body 402 between a first position (as shown in FIGS. 22 and 23), in which the first sensor assembly 404 is disposed at angle relative to the inner surface 408 of the bracket body 402, and a second position (as shown in FIGS. 15-21 and 24-27), in which at least a portion of the first sensor assembly 404 is disposed within the first sensor opening 430, along with a plurality of positions therebetween. More specifically, the first sensor assembly 404 can be rotated from the first position to the second position by moving the first sensor assembly 404 in the direction indicated by arrow C in FIG. 23. As discussed in greater detail herein, with the first sensor assembly 404 rotated toward the second position (i.e., the installed or secured position) the one or more sensor fasteners 424 can be utilized to removably secure or attach the first sensor assembly 404 to the bracket body 402 in the second position. In some embodiments, the connector 420 can be integrally formed with the sensor body 428 such that the entire first sensor assembly 404 is secured to the first pivoting portion 566 at the connector 420 and an electrical circuit (not shown) is then attached to the connector 420 of the first sensor assembly 404.

Referring to FIGS. 24-27, the first sensor 422 is attached or coupled to the sensor portion 458 of the sensor body 428. More specifically, the first sensor 422 includes a sensor housing 470 attached to a first or top side 472 of the sensor body 428 along the sensor portion 458 and a sensor pad 474 attached to a second or bottom side 476 of the sensor body 428 along the sensor portion 458, opposite the top side 472. Thus, with the first sensor assembly 404 in the second position (as shown in FIGS. 15-21 and 24-27) at least a portion of the sensor body 428 (e.g., the bottom side 476 of the sensor portion 458) and the sensor pad 474 of the first sensor 422 are disposed within the first sensor opening 430 of the bracket body 402. In some embodiments, at least the sensor pad 474 can extend through the first sensor opening 430 of the bracket body 402 and be aligned with or extend past the outer surface 410 of the bracket body 402. In some embodiments, the sensor pad 474 can include an adhesive outer surface. In some embodiments, the first sensor 422 can be pre-assembled with the sensor body 428 and the one or more sensor fasteners 424. In some embodiments, the one or more sensor fasteners 424 can fasten the first sensor 422 to the sensor body 428 in addition to fastening the first sensor assembly 404 to the bracket body 402 in the second position.

As briefly described above, the one or more sensor fasteners 424 can be configured to removably attach or secure the first sensor assembly 404 to the bracket body 402 when the first sensor assembly 404 is secured to the first pivoting portion 566 and in the second position (as shown in FIGS. 15-21 and 24-27). In the illustrated embodiment, the one or more sensor fasteners 424 includes a first clip 424a (i.e., the first sensor fastener) extending from a first lateral side 480 of the sensor body 428 and a second clip 424b (i.e., the second sensor fastener) extending from a second lateral side 482 of the sensor body 428, opposite the first lateral side 480. In some embodiments, the clips 424a, 424b can be attached to the sensor housing 470 of the first sensor 422 of the first sensor assembly 404. In some embodiments, the clips 424a, 424b can be integrally formed with the sensor body 428 or the sensor housing 470 of the first sensor 422 of the first sensor assembly 404.

Figures 24, 25:
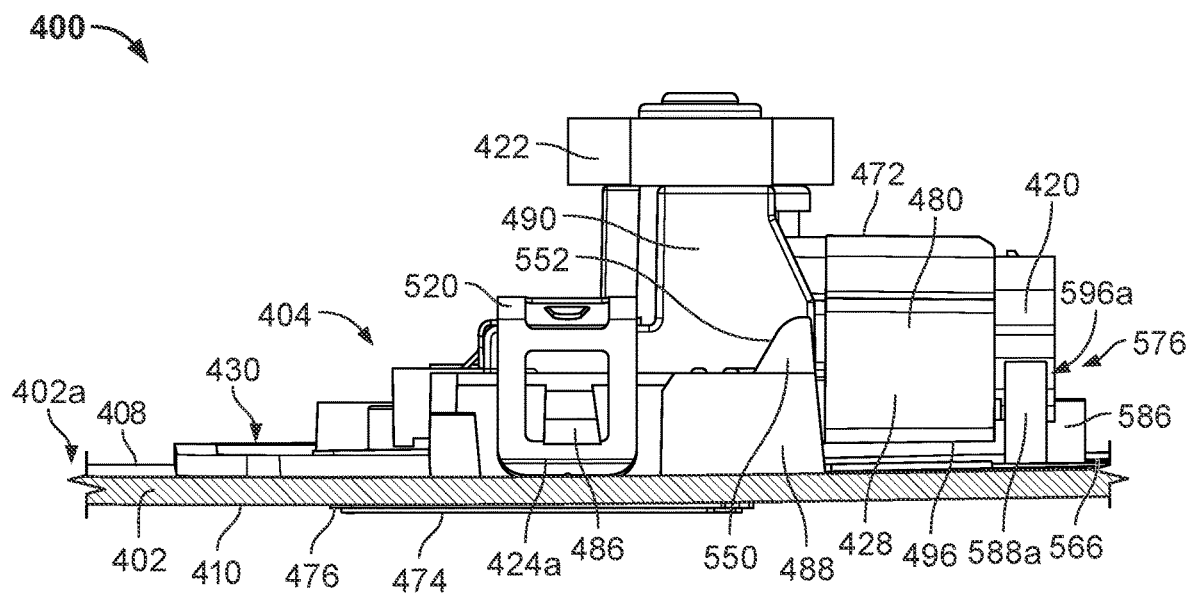
FIG. 24 is a left side view of the first sensor assembly of FIG. 16.
FIG. 25 is a right side view of the first sensor assembly of FIG. 16.

Referring specifically to FIG. 24, the first clip 424a of the first sensor assembly 404 is configured to engage a first fastener protrusion 486 formed on an outer side of a first sensor opening protrusion 488 of the bracket body 402 that is disposed adjacent to a first lateral side 490 (see FIGS. 17 and 18) of the first sensor opening 430 of the bracket body 402. Similarly, referring specifically to FIG. 25, the second clip 424b of the first sensor assembly 404 is configured to engage a second fastener protrusion 492 formed on an outer side of a second sensor opening protrusion 494 of the bracket body 402 that is disposed adjacent to a second lateral side 496 (see FIGS. 17 and 18) of the first sensor opening 430 of the bracket body 402, opposite the first lateral side 490.

Referring again to FIGS. 17 and 18, in some embodiments, a first fastener opening 502 and a second fastener opening 504 can extend through the inner and outer surfaces 408, 410 of the bracket body 402 adjacent to the first and second fastener protrusions 486, 492, respectively, such that a user can disengage the first and second clips 424a, 424b from the first and second fastener protrusions 486, 492, respectively, from the outer surface 410 of the bracket body 402. In some embodiments, the first sensor assembly 404 can include three or more sensor fasteners or clips. For example, referring specifically to FIG. 17, a third clip (not shown) can extend from the second end 460 of the sensor body 428 and can be configured to engage a third fastener protrusion (not shown) of the bracket body 402 disposed adjacent to the front end 512 of the first sensor opening 430.

Referring to FIG. 17, in the illustrated embodiment, the clips 424a, 424b are integrally formed with a clip bracket 520 that is attached to the sensor housing 470 of the first sensor 422. More specifically, the clip bracket 520 includes a clip bracket base 522 disposed on a top side 524 of the sensor housing 470 such that the clips 424a, 424b extend from opposing sides of the clip bracket base 522. In addition, the clip bracket 520 can further include a clip bracket mounting plate 526 extending at an angle from the clip bracket base 522 adjacent to each of the clips 424a, 424b that can be configured to contact a front side 528 of the sensor housing 470. Further, a clip bracket opening 530 can extend through the clip bracket mounting plate 526 and can be configured to fixedly receive a clip bracket mounting protrusion 532 extending outwardly from the front side 528 of the sensor housing 470. Thus, with the clip bracket mounting protrusion 532 of the sensor housing 470 received within the clip bracket opening 530 of the clip bracket 520, the clip bracket 520 is removably secured to the sensor housing 470 with the clip bracket base 522 contacting the top side 524 of the sensor housing 470 and the clip bracket mounting plate 526 contacting or engaging the front side 528 of the sensor housing 470.

In some embodiments, the clip bracket mounting plate 526 can include the clip bracket mounting protrusion 532 rather than the clip bracket opening 530, and the sensor housing 470 can include the clip bracket opening 530 rather than the clip bracket mounting protrusion 532. In some embodiments, the sensor housing 470 can include a slot (not shown) that can receive at least the clip bracket base 522 of the clip bracket 520. In some embodiments, the clip bracket 520 can be coupled to the sensor body 428. In some embodiments, the first sensor assembly 404 can include two or more clip brackets 520.

The first sensor assembly 404 can include additional structures that can be configured to engage the bracket body 402 to generally secure or align the first sensor assembly 404 relative to the first sensor opening 430 of the bracket body 402. For example, referring specifically to FIG. 17, the sensor housing 470 includes a first lateral protrusion 538 extending from the first lateral side 480 of the sensor body 428 toward the first end 456 of the sensor body 428 and a second lateral protrusion 540 extending from the second lateral side 482 of the sensor body 428 opposite the first lateral protrusion 538. In the illustrated embodiment, the first lateral protrusion 538 is configured to be received within a first alignment slot 542 extending through both a top side and inner side of the first sensor opening protrusion 488 as the first sensor assembly 404 is rotated from the first position toward the second position. Similarly, the second lateral protrusion 540 is configured to be received within a second alignment slot 544 extending through both a top side and inner side of the second sensor opening protrusion 494 as the first sensor assembly 404 is rotated from the first position toward the second position.

In the illustrated embodiment, the lateral protrusions 538, 540 are configured to contact a first or rear surface 546 of the first and second alignment slots 542, 544, respectively, to align the first sensor assembly 404 relative to the first sensor opening 430 as the sensor assembly is rotated to the second position (as shown in FIGS. 15-21 and 24-27). Further, the rear surfaces 546 of the alignment slots 542, 544 can be sloped downwardly toward the inner surface 408 of the bracket body 402 to provide a ramped incline to guide the first sensor assembly 404 into alignment with the first sensor opening 430 of the bracket body 402. Thus, the lateral protrusions 538, 540 of the first sensor assembly 404 can be configured to slidably contact the alignment slots 542, 544, respectively, of the bracket body 402 to position the first sensor assembly 404 in a front-to-back direction of the first sensor opening 430.

Figure 26:
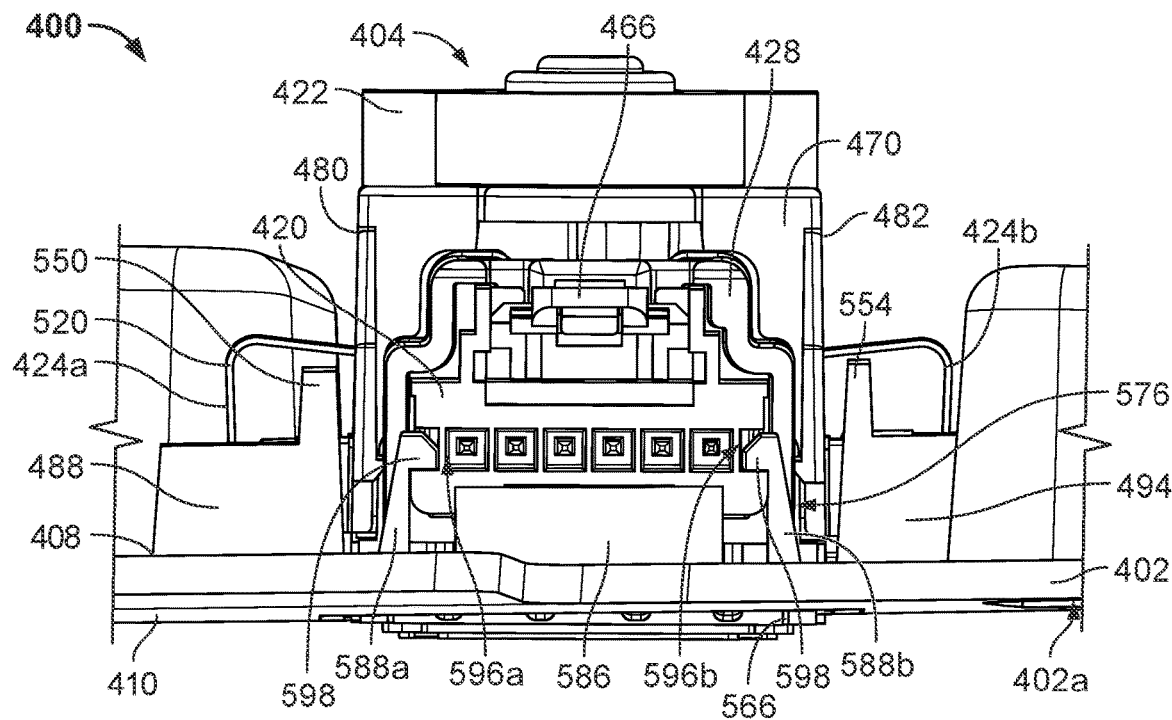
FIG. 26 is a rear elevation view of the first sensor assembly of FIG. 16.
Figure 27:
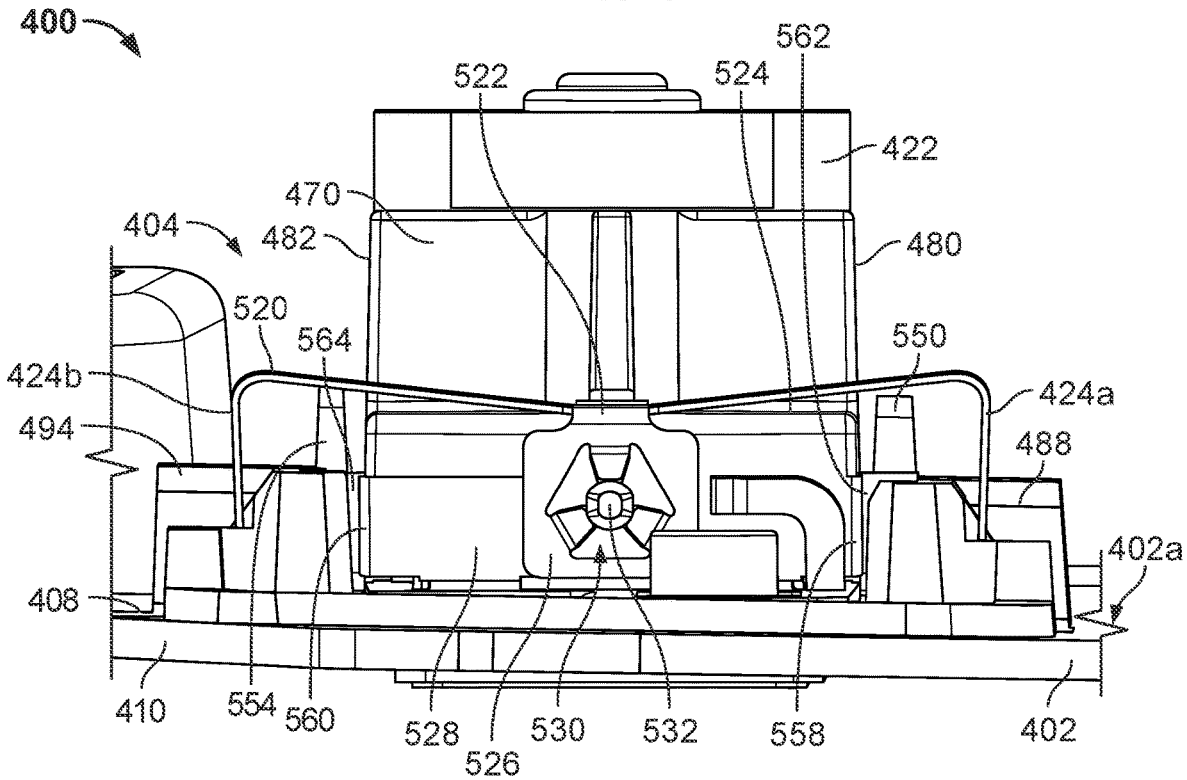
FIG. 27 is a front elevation view of the first sensor assembly of FIG. 16.

Referring specifically to FIGS. 26 and 27, in addition to the sloped rear surfaces 546 of the first and second alignment slots 542, 544, a first slot protrusion 550 (see FIG. 26) can extend upwardly from the top side of the first sensor opening protrusion 488 adjacent to a second or front surface 552 of the first alignment slot 542 and a second slot protrusion 554 (see FIG. 27) can extend upwardly from the top side of the second sensor opening protrusion 494 adjacent to the front surface 552 of the second alignment slot 544. The first and second slot protrusions 550, 554 of the bracket body 402 can include an inclined surface that slopes downwardly toward the first and second alignment slots 542, 544, respectively, that can be configured to slidably engage the first and second lateral protrusions 538, 540, respectively, to guide the lateral protrusions 538, 540 into the alignment slots 542, 544, respectively, as the first sensor assembly 404 is rotated from the first position toward the second position.

Referring to FIG. 27, the sensor housing 470 can further include a third lateral protrusion 558 extending from the first lateral side 480 of the first sensor assembly 404 between the first lateral protrusion 538 and the second end 460 of the sensor body 428 and a fourth lateral protrusion 560 extending from the second lateral side 482 of the first sensor assembly 404 opposite the third lateral protrusion 558. The third lateral protrusion 558 can be configured to slidably contact a first side ramp 562 formed on an inner side of the first sensor opening protrusion 488 adjacent to the first lateral side 490 of the first sensor opening 430 of the bracket body 402 as the first sensor assembly 404 is rotated from the first position to the second position. Similarly, the fourth lateral protrusion 560 can be configured to slidably contact a second side ramp 564 formed on an inner side of the second sensor opening protrusion 494 adjacent to the second lateral side 496 of the first sensor opening 430 of the bracket body 402 as the first sensor assembly 404 is rotated from the first position to the second position. Thus, the third and fourth lateral protrusions 558, 560 of the first sensor assembly 404 can be configured to slidably contact the first and second side ramps 562, 564, respectively, of the bracket body 402 to position the first sensor assembly 404 in a lateral direction of the first sensor opening 430.

In some embodiments, the first sensor assembly 404 can include five or more alignment protrusions. For example, in some embodiments, a fifth alignment protrusion (not shown) can extend from the second end 460 of the sensor body 428 that can be configured to engage a rear slot or ramp (not shown) of the bracket body 402 disposed adjacent to the front end 512 of the first sensor opening 430 of the bracket body 402.

Referring now to FIGS. 28-37, the second sensor assembly 406 and the second sensor portion 402b of the bracket body 402 of the bracket assembly 400 are shown. The second sensor assembly 406 and the second sensor portion 402b of the bracket body 402 are similar in some aspects to the first sensor assembly 404 and the first sensor portion 402a of the bracket body 402, with like elements being indicated by similar reference numerals under the "6xx" series and the "7xx" series of reference numerals. For example, the second sensor assembly 406 includes a connector 620, a second sensor 622, and one or more sensor fasteners 624, just as the first sensor assembly 404 includes the connector 420, the first sensor 422, and the one or more sensor fasteners 424. Further, the second sensor portion 402b of the bracket body 402 includes a second pivoting portion 766 that is rotatably moveable relative to a second sensor opening 630 and configured to receive the connector 620 of the second sensor assembly 406, just as the first pivoting portion 566 of the first sensor portion 402a of the bracket body 402 is rotatably moveable relative to the first sensor opening 430 and configured to receive the connector 420 of the first sensor assembly 404.

Figure 28:
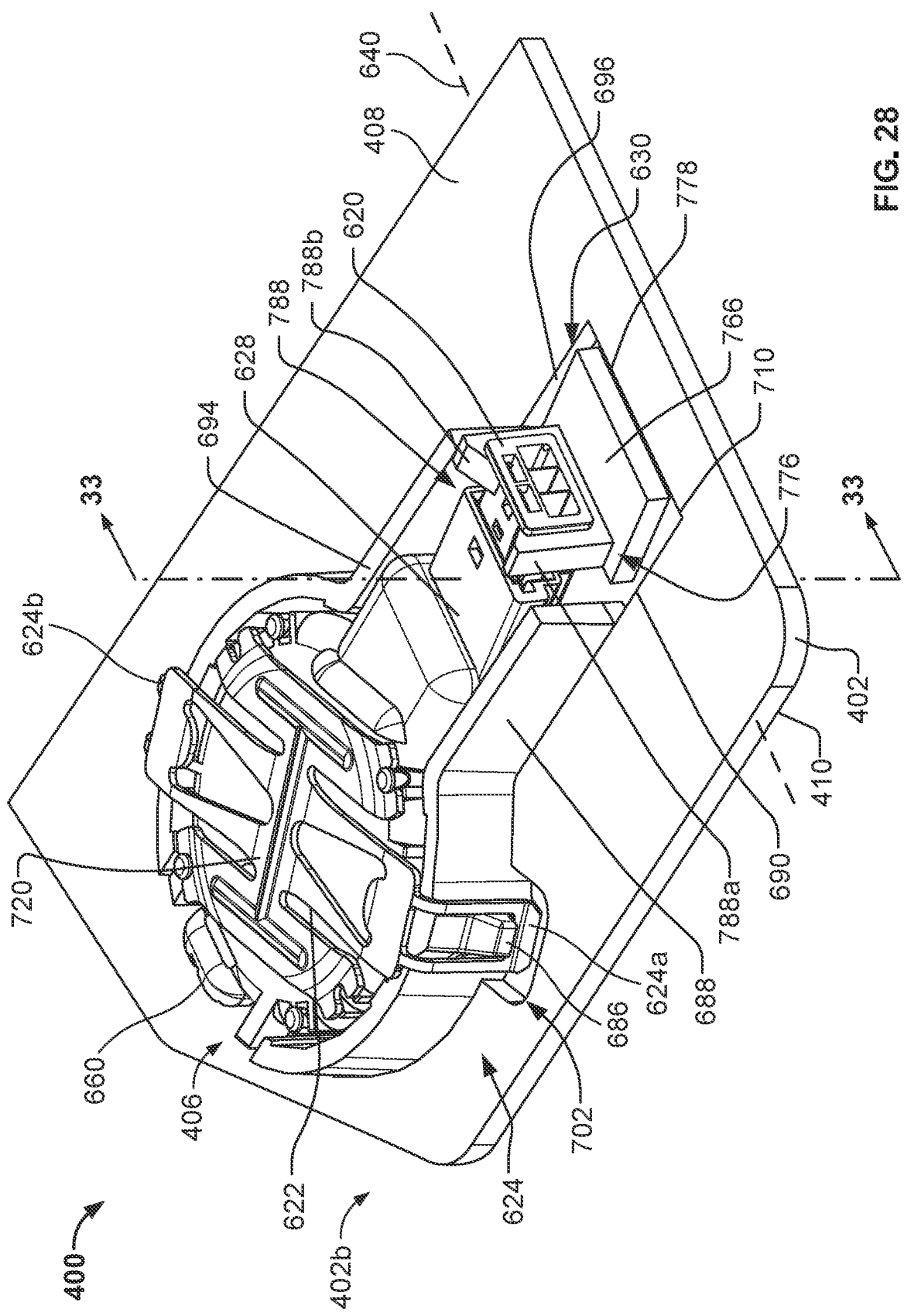
FIG. 28 is a rear-left-top isometric view of a second sensor assembly attached to a second sensor portion of the bracket body of the bracket assembly of FIG. 15.

Referring specifically to FIGS. 28-30, similar to the first sensor 422 of the first sensor assembly 404 as described with reference to FIGS. 16-27, the second sensor 622 can be attached or integrally formed with a sensor body 628, which can be removably attached to the connector 620. It should be appreciated that while the second sensor 622 is described in connection to the sensor body 628, the second sensor 622 and the sensor body 628 can be a single-piece unitary component. Thus, the second sensor 622 can be electrically coupled with the connector 620 by removably coupling the sensor body 628 with the connector 620, similar to the connector 420 and the sensor body 428 of the first sensor assembly 404 as described with reference to FIGS. 16-27. In the illustrated embodiment, the sensor body 628 has an attachment portion 654 at a first end 656 and a sensor portion 658 extending from the attachment portion 654 to a second end 660 of the sensor body 628, opposite the first end 656. The attachment portion 654 of the sensor body 628 is configured to receive and removably couple to the connector 620 such that the attachment portion 654 is disposed between the connector 620 and the sensor portion 658 of the sensor body 628. It should be appreciated that, in some embodiments, the connector 620 can be configured to receive the sensor body 628. While an exemplary coupling mechanism has been described herein, it is contemplated that any suitable coupling mechanism may be utilized to secure the second sensor 622 with the connector 620.

Referring still to FIGS. 28-30, at least a portion of the second sensor assembly 406 (e.g., the connector 620) is configured to be removably attached to a second pivoting portion 766 of the second sensor portion 402b of the bracket body 402. In the illustrated embodiment, the second pivoting portion 766 of the second sensor portion 402b is configured similar to the first pivoting portion 566 of the first sensor portion 402a. Thus, like the first pivoting portion 566, the second pivoting portion 766 includes a connector attachment structure 776 and is configured to be pivotable about a pivot axis 640 (see FIG. 28) relative to the bracket body 402. In particular, the second pivoting portion 766 is attached to a hinge 778 arranged along a first or rear end 710 of the second sensor opening 630, opposite a second or front end 712, such that the second pivoting portion 766 is pivotable relative to the bracket body 402 within the second sensor opening 630 between a first position (not shown), in which the second pivoting portion 766 is at an angle relative to the inner surface 408 of the bracket body 402, and a second position (as shown in FIGS. 28-37), in which the second pivoting portion 766 is disposed substantially within the second sensor opening 630. In the illustrated embodiment, the second pivoting portion 766 is integrally formed with the bracket body 402 and the hinge 778 is an integral or living hinge formed between the second pivoting portion 766 and bracket body 402 along the second sensor opening 630. In some embodiments, the hinge 778 of the bracket body 402 can be formed of a first material and the bracket body 402 and/or the second pivoting portion 766 can be formed of a second material that is different than the first material.

Figure 33:
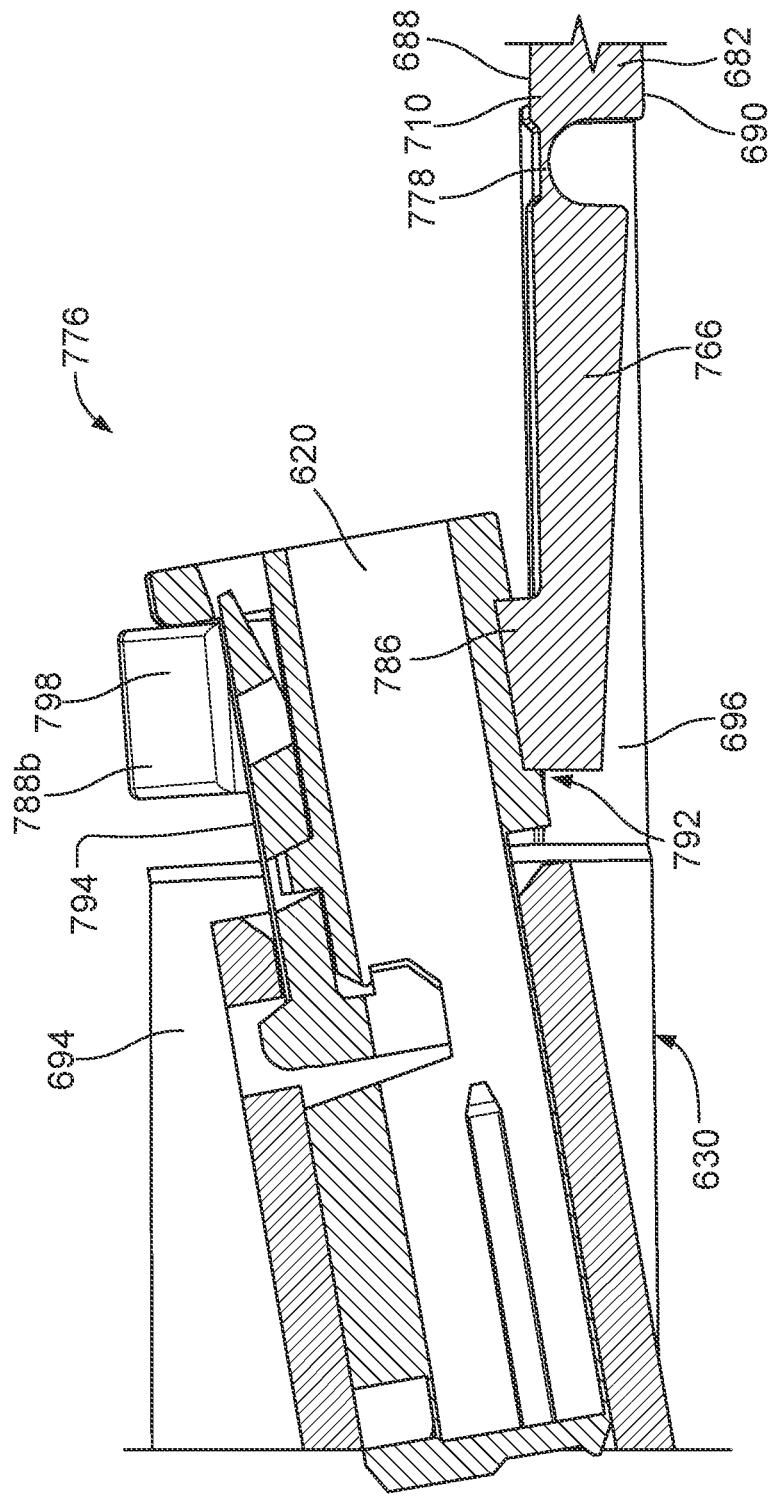
FIG. 33 is a partial cross-sectional view taken along line 33-33 of FIG. 28.

Referring to FIGS. 31 and 32, the connector attachment structure 776 is configured to receive and removably secure the connector 620 to the second pivoting portion 766 in one or more directions relative to the second pivoting portion 766, similar to the connector attachment structure 576 of the first pivoting portion 566. In the illustrated embodiment, the connector attachment structure 776 includes a connector protrusion 786 configured to secure the connector 620 in a first direction, i.e., a direction extending from the second end 660 to the first end 656 of the sensor body 628 (see FIG. 29), and one or more connector fasteners 788 configured to secure the connector 620 in a second direction that is substantially perpendicular to the first direction. As shown in FIG. 33, when the connector 620 is received by the connector attachment structure 776, the connector protrusion 786 is configured to engage a portion of the connector 620 and the one or more connector fasteners 788 is configured to engage another portion of the connector 620. In the illustrated embodiment, the connector protrusion 786 is configured to be received within a connector channel 792 of the connector 620. Thus, the connector protrusion 786 can prevent movement of the connector 620 in the first direction relative to the second pivoting portion 766. In some embodiments, the connector protrusion 786 can be included on the connector 620 and the connector channel 792 can be defined along the second pivoting portion 766. In some embodiments, the connector attachment structure 776 of the second pivoting portion 766 can include two or more connector protrusions.

Figure 36:
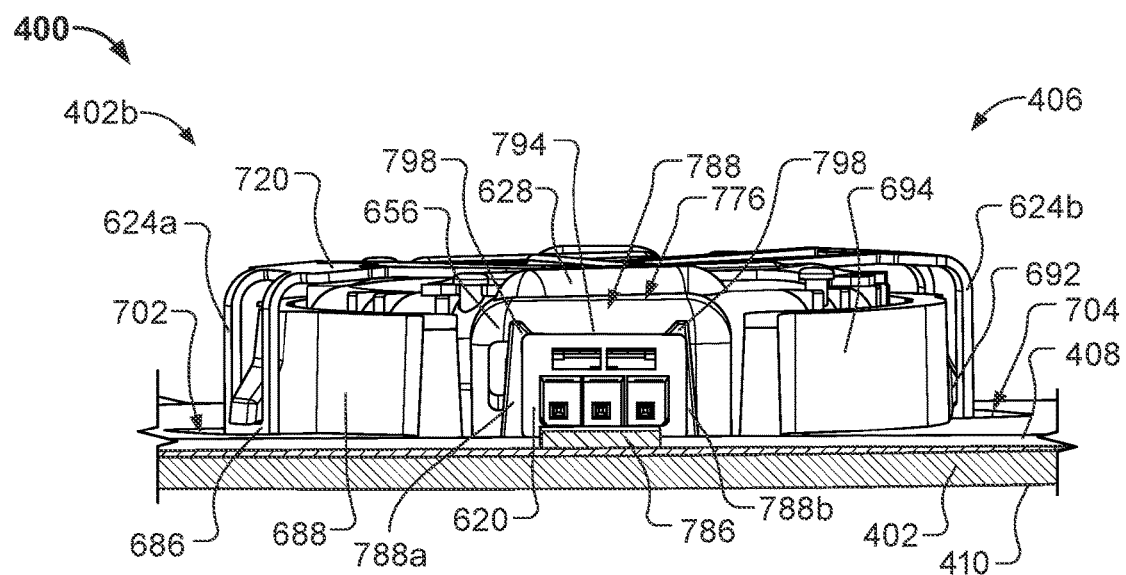
FIG. 36 is a rear elevation view of the second sensor assembly of FIG. 28.

Referring to FIG. 36, the one or more connector fasteners 788 includes a first connector fastener 788*a* and a second connector fastener 788*b* that are configured to engage an upper side 794 of the connector 620. In the illustrated embodiment, the first and second connector fasteners 788*a*, 788*b* extend from opposing sides of the connector protrusion 786 and each have a connector fastener protrusion 798 defined along an upper end thereof configured to engage the upper side 794 of the connector 620 when the connector protrusion 786 is received within the connector channel 792 (see FIG. 33). Thus, the first and second connector fasteners 788*a*, 788*b* can prevent movement of the connector 620 in the second direction relative to the second pivoting portion 766. In some embodiments, the connector attachment structure 776 can include three or more connector fasteners 788. For example, in some such embodiments, the connector attachment structure 776 can include one connector protrusion 786 and four connector fasteners 788.

Similar to the first pivoting portion 566 of the first sensor portion 402*a* of the bracket body 402 and the connector 420 of the first sensor assembly 404, the connector 620 of the second sensor assembly 406 can be installed to the connector attachment structure 776 of the second pivoting portion 766 by inserting the connector 620 in between the first and second connector fasteners 788*a*, 788*b* until the connector protrusion 786 of the second pivoting portion 766 is received within the connector channel 792 of the connector 620 (as shown in FIG. 33). In some embodiments, the connector fasteners 788*a*, 788*b* can be configured to elastically deform outward relative to the connector protrusion 786 as the connector 620 is inserted between the connector fastener protrusions 798 of the first and second connector fasteners 788*a*, 788*b* and to return to their original shape once the connector fastener protrusions 798 engage the upper side 794 of the connector 620. While an exemplary coupling mechanism has been described herein, it is contemplated that any suitable coupling mechanism may be utilized to secure (e.g., removably) the connector 620 with the second fastening portion 766.

Referring again to FIG. 28, with the sensor body 628 removably coupled to the connector 620, the sensor body 628 (and the second sensor 622 attached thereto) is pivotable with the connector 620 about the pivot axis 640 relative to the inner surface 408 of the bracket body 402, similar to the first sensor assembly 404 removably coupled to the first pivoting portion 566. Thus, with the connector 620 secured to the second pivoting portion 766 and the sensor body 628 coupled to the connector 620, the entire second sensor assembly 406 is rotatable about the pivot axis 640. More specifically, the second sensor assembly 406 is rotatable about the pivot axis 640 relative to the inner surface 408 of the bracket body 402 between a first position (not shown), in which the second sensor assembly 406 is disposed at angle relative to the inner surface 408 of the bracket body 402, and a second position (as shown in FIGS. 28-30 and 33-37), in which at least a portion of the second sensor assembly 406 is disposed within the second sensor opening 630, along with a plurality of positions therebetween. As discussed in greater detail herein, with the second sensor assembly 406 rotated toward the second position (i.e., the installed or secured position) the one or more sensor fasteners 624 can be utilized to removably secure or attach the second sensor assembly 406 to the bracket body 402 in the second position.

Figure 37:
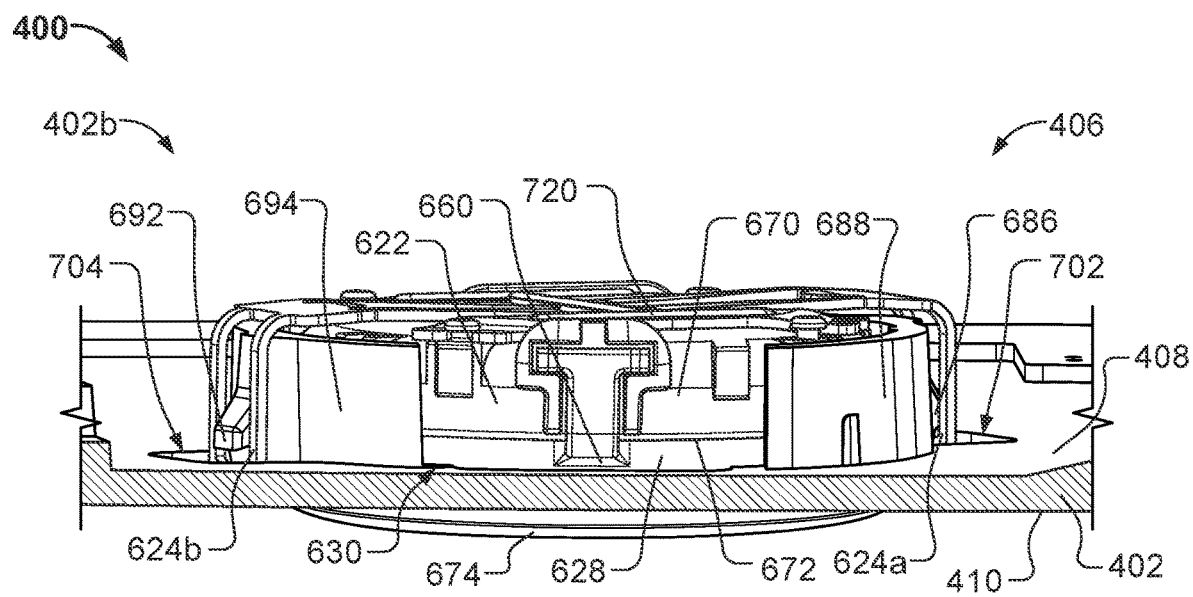
FIG. 37 is a front elevation view of the second sensor assembly of FIG. 28.

Referring to FIG. 37, the second sensor 622 is attached or coupled to the sensor portion 658 of the sensor body 628. More specifically, the second sensor 622 includes a sensor housing 670 attached to a first or top side 672 of the sensor body 628 along the sensor portion 658 and a sensor pad 674 attached to a second or bottom side 676 of the sensor body 628 along the sensor portion 658, opposite the top side 672. Thus, referring again to FIGS. 34 and 35, with the second sensor assembly 406 in the second position (as shown in FIGS. 28-30 and 33-37) at least a portion of the sensor body 628 (e.g., the bottom side 676 of the sensor portion 658) and the sensor pad 674 of the second sensor 622 are disposed in the second sensor opening 630 of the bracket body 402. In some embodiments, at least the sensor pad 674 can extend through the second sensor opening 630 of the bracket body 402 and be aligned with or extend past the outer surface 410 of the bracket body 402. In some embodiments, the sensor pad 674 can include an adhesive outer surface. In some embodiments, the second sensor 622 can be pre-assembled with the sensor body 628 and the one or more sensor fasteners 624. In some embodiments, the one or more sensor fasteners 624 can fasten the second sensor 622 to the sensor body 628 in addition to fastening the second sensor assembly 406 to the bracket body 402 in the second position.

Referring again to FIG. 29, the one or more sensor fasteners 624 can be configured to removably attach or secure the second sensor assembly 406 to the bracket body 402 when the second sensor assembly 406 is secured to the second pivoting portion 766 in the second position (as shown in FIGS. 28-30 and 33-37). In the illustrated embodiment, the one or more sensor fasteners 624 includes a first clip 624*a* (i.e., a first sensor fastener) extending from a first lateral side 680 of the sensor body 628 and a second clip 624*b* (i.e., a second sensor fastener) extending from a second lateral side 682 of the sensor body 628, opposite the first lateral side 680. In some embodiments, the clips 624*a*, 624*b* can be attached to the sensor housing 670 of the second sensor 622 of the second sensor assembly 406. In some embodiments, the clips 624*a*, 624*b* can be integrally formed with the sensor body 628 or the sensor housing 670 of the second sensor 622 of the second sensor assembly 406.

Figure 34:
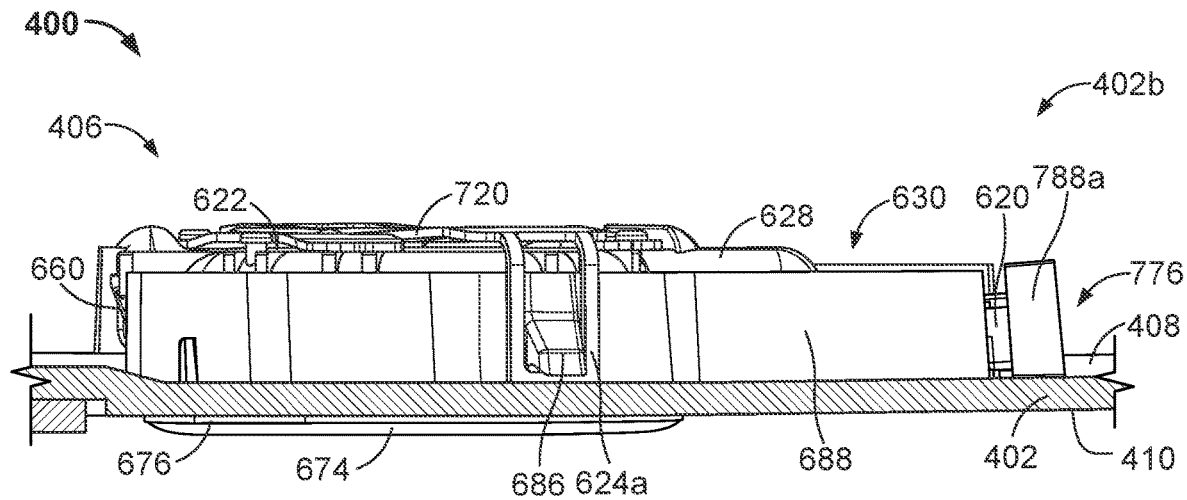
FIG. 34 is a left side view of the second sensor assembly of FIG. 28.
Figure 35:
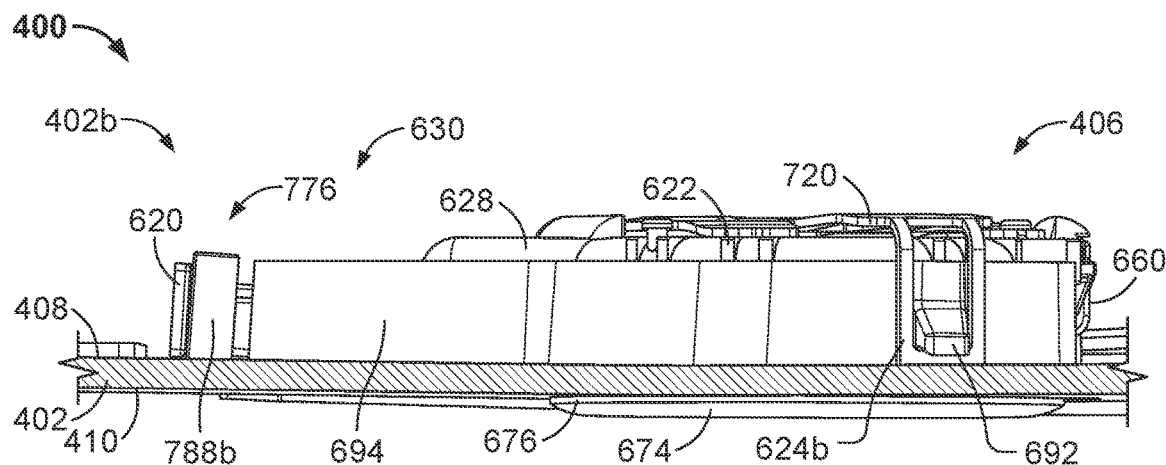
FIG. 35 is a right side view of the second sensor assembly of FIG. 28.

Referring specifically to FIG. 34, the first clip 624*a* of the second sensor assembly 406 is configured to engage a first fastener protrusion 686 formed on an outer side of a first sensor opening protrusion 688 of the bracket body 402 that is disposed adjacent to a first lateral side 690 (see FIG. 29) of the second sensor opening 630. Similarly, referring specifically to FIG. 35, the second clip 624*b* of the second sensor assembly 406 is configured to engage a second fastener protrusion 692 formed on an outer side of a second sensor opening protrusion 694 of the bracket body 402 that is disposed adjacent to a second lateral side 696 (see FIG. 29) of the second sensor opening 630, opposite the first lateral side 690. In the illustrated embodiment, the clips 624a, 624b of the second sensor assembly 406 and the corresponding fastener protrusions 686, 692 of the second sensor portion 402b oppose each other and are arranged at an angle from the pivot axis 640 (see FIG. 28). In some embodiments, the clips 624a, 624b and the corresponding fastener protrusions 686, 692 can be parallel to the pivot axis 640.

Referring again to FIGS. 29 and 30, in some embodiments, a first fastener opening 702 and a second fastener opening 704 can extend through the inner and outer surfaces 408, 410 of the bracket body 402 adjacent to the first and second fastener protrusions 686, 692, respectively, such that a user can disengage the first and second clips 624a, 624b from the first and second fastener protrusions 686, 692, respectively, from the outer surface 410 of the bracket body 402. Referring specifically to FIG. 29, in the illustrated embodiment, the clips 624a, 624b are integrally formed with a clip bracket 720 that is attached to the sensor housing 670 of the second sensor 622. The clip bracket 720 of the second sensor assembly 406 can be configured generally similar to the clip bracket 520 of the first sensor assembly 404 as described with reference to FIGS. 16-27. In some embodiments, the clip bracket 720 can be coupled to the sensor body 628. In some embodiments, the second sensor assembly 406 can include two or more clip brackets 720.

Similar to the first sensor portion 402a of the bracket body 402, the second sensor portion 402b can include additional structures that can be configured to generally align the second sensor assembly 406 relative to the second sensor opening 630 of the bracket body 402. For example, referring specifically to FIG. 32, the second sensor portion 402b of the bracket body 402 includes a first plurality of ramps 762 extending outwardly from an inner side of the first sensor opening protrusion 688 and into the second sensor opening 630 and a second plurality of ramps 764 extending outwardly from an inner side of the second sensor opening protrusion 694 and into the second sensor opening 630 opposite the first plurality of ramps 762. The first and second plurality of ramps 762, 764 can be configured to be slidably engaged by the sensor body 628 as the second sensor assembly 406 is rotated from the first position toward the second position to help align the second sensor assembly 406 within the second sensor opening 630. In the illustrated embodiment, the second sensor 622 is generally circular shaped and thus the first plurality of ramps 762 includes a first ramp 762a, a second ramp 762b, and a third ramp 762c and the second plurality of ramps 764 includes a fourth ramp 764a, a fifth ramp 764b, and a sixth ramp 764c. In some embodiments, the second sensor portion 402a of the bracket body 402 can include seven or more ramps.

Figure 38:
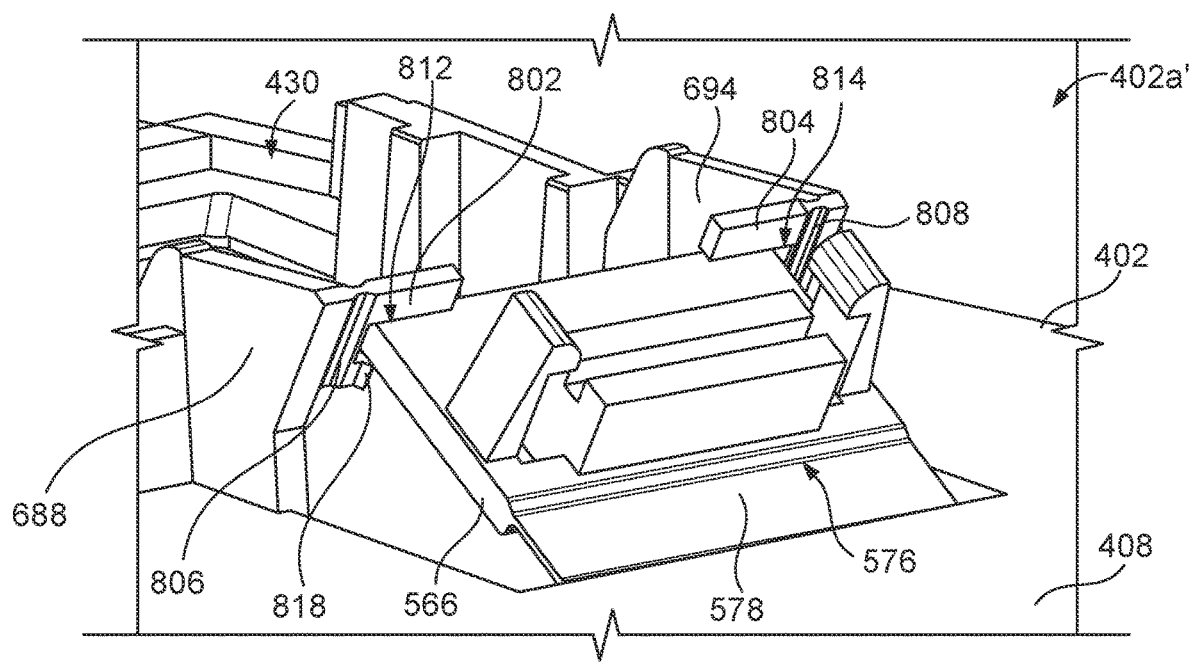
FIG. 38 is perspective partial view of another embodiment of a first sensor portion of the bracket body of FIG. 15.

It is contemplated that, in some embodiments, the bracket body 402 can include additional structural features to aid in the installation process of one or both of the first and second sensor assemblies 404, 406 to the bracket body 402. In this regard, FIG. 38 depicts an alternative embodiment of a first sensor portion 402a' and of the bracket body 402 of the bracket assembly 400 as described with reference to FIGS. 15-27. Referring to FIG. 38, in the illustrated embodiment, the first sensor portion 402a' of the bracket body 402 includes a first holding portion 802 integrally formed with the first sensor opening protrusion 688 and a second holding portion 804 integrally formed with the second sensor opening protrusion 694. A first holding hinge 806 is disposed between the first holding portion 802 and the first sensor opening protrusion 488, and a second holding hinge 808 is disposed between the second holding portion 804 and the second sensor opening protrusion 694.

Referring still to FIG. 38, the first and second holding portions 802, 804 are pivotable relative to the first and second sensor opening protrusions 688, 694, respectively, via the first and second holding hinges 806, 808, respectively, between a first position (as shown in FIG. 38) and a second position (not shown). With the first and second holding portions 802, 804 in the first position (as shown in FIG. 38), the first pivoting portion 566 of the bracket body 402 is received within a first holding opening 812 defined in the first holding portion 802 and a second holding opening 814 defined in the second holding portion 804 such that the first pivoting portion 566 is secured at an angle relative to the bracket body 402. With the first pivoting portion 566 secured by the first and second holding portions 802, 804 of the first sensor portion 402a', a user can more easily attach the connector 420 (see FIG. 22) to the connector attachment structure 576 of the first pivoting portion 566 and/or couple electrical wiring (not shown) to the connector 420 after the connector 420 is coupled to the first pivoting portion 566.

With continued reference to FIG. 38, the first and second holding portions 802, 804 of the first sensor portion 402a' further include a first pivot flange 818 and a second pivot flange (not shown), respectively. In the illustrated embodiment, the first pivot flange 818 and the second pivot flange (not shown) are configured to be engaged by the first pivoting portion 566 as a user moves the first pivoting portion 566 toward the second position, e.g., in a direction as indicated by the arrow C in FIG. 23, and causes the first and second holding portions 802, 804 to pivot away from the first pivoting portion 566 and toward the second position (not shown). With the first and second holding portions 802, 804 in the second position (not shown), the holding portions 802, 804 no longer secure the first pivoting portion 566 and the first pivoting portion 566 can be rotated to the second position (as shown in FIGS. 15-21 and 24-27). In some embodiments, the holding portions 802, 804 can be formed on the first pivoting portion 566 instead of the sensor opening protrusions 688, 694. In some embodiments, the second sensor portion 402b of the sensor body 402 can include one or more holding portions that are configured similar to the holding portions 802, 804 to secure the second pivoting portion 766 of the bracket body 402.

It should be appreciated that the sensors 422, 622 of the first and second sensor assemblies 404, 406, respectively, can be any suitable sensor to measure or sense a physical property and environment surrounding the respective sensor 422, 622, such as, e.g., a humidity sensor, temperature sensor, vibration sensor, air-flow sensor, rain sensor, accelerometer sensor, gyroscope sensor, magnetometer, barometer, inertial measurement unit (IMU) sensor, etc.

Referring to FIGS. 15-37, in some embodiments, one or both of the sensor pads 474, 674 (see FIGS. 24 and 34, respectively) of the first and second sensors 422, 622, respectively, can be configured to be adjacent (e.g., contact) a surface adjacent to the outer surface 410 of the bracket body 402. Accordingly, in some embodiments, one or both of the sensor pads 474, 674 of the first and second sensors 422, 622, respectively, can include an adhesive surface configured to removably attach to a surface adjacent to the outer surface 410 of the bracket body 402. For example, referring again to the exemplary implementation shown in FIG. 2, at least one of the sensor pads 474, 674 (see FIGS.

5 and 17, respectively) of the sensors 422, 622, respectively, can be in contact with an interior surface of the glass 118 of the vehicle 116 that is adjacent to the outer surface 410 of the bracket body 402 when the sensor assemblies 404, 406 are removably secured to the bracket body 402. Thus, in such implementations, at least one of the sensors 422, 622 (including the sensor 122 of the sensor assembly 104 of FIG. 1) can be configured to measure some physical properties (e.g., outside conditions, vibration, etc.) in connection with the glass 118 of the vehicle 116. However, it should be appreciated that the sensors 422, 622 (including the sensor 122 of the sensor assembly 104 of FIG. 1) are not limited to measure physical properties in connection with the glass 118. For example, at least one of the sensors 422, 622 can be configured to measure the temperature of the air, the humidity in the air, or any other suitable physical property in the environment surrounding the sensors 422, 622 and/or the vehicle 116. In further examples, one or both of the sensors 422, 622 (including the sensor 122 of the sensor assembly 104 of FIG. 1) can include any suitable sensor used in automotive driver assistance or autonomy systems of the vehicle 116. For example, at least one of the sensors 422, 622 can include a light detection and ranging (LiDar) sensor, an infrared (IR) sensor, a radar sensor, or any other suitable sensor.

As previously described above, aspects of the present disclosure can include methods or processes for installing a sensor assembly. As another example, shown in FIG. 39, a method 900 for installing a sensor assembly onto a bracket body (such as, e.g., the first sensor assembly 404 and the first sensor portion 402a of the bracket body 402 illustrated in FIG. 15) can include step 910, which can include secure (e.g., removably) a connector of a sensor assembly with a pivoting portion of a bracket body. For example, with reference to the first sensor assembly 404 and the first sensor portion 402a of the bracket body 402 of FIGS. 16-27, step 910 of method 900 can include removably securing the connector 420 of the sensor assembly 404 to the connector attachment structure 576 of the first pivoting portion 566 of the bracket body 402 by inserting the connector 420 between the first and second connector fasteners 588a, 588b (see FIG. 26) in the direction of arrow A of FIG. 22 such that the flange 592 of the connector 420 is received within the connector recess 590 of the connector protrusion 586 (see FIG. 21) and the connector 420 is rotatable with the first pivoting portion 566 about the pivot axis 440 (see FIG. 16).

With the connector of the sensor assembly secured to the pivoting portion of the bracket body, as in step 910, method 900 can further include step 920, which can include coupling a sensor body of the sensor assembly with the connector. For example, with reference again to the first sensor assembly 404 and the first sensor portion 402a of the bracket body 402 of FIGS. 16-27, step 920 of method 900 can include inserting a portion of the connector 420 into the first end 456 of the sensor body 428 of the first sensor assembly 404 in the direction of arrow B of FIG. 23 to removably couple the sensor body 428 with the connector 420 such that the first sensor assembly 404 is in the first position (as shown in FIG. 23) and is pivotable about the pivot axis 440 (see FIG. 16).

Figure 39:
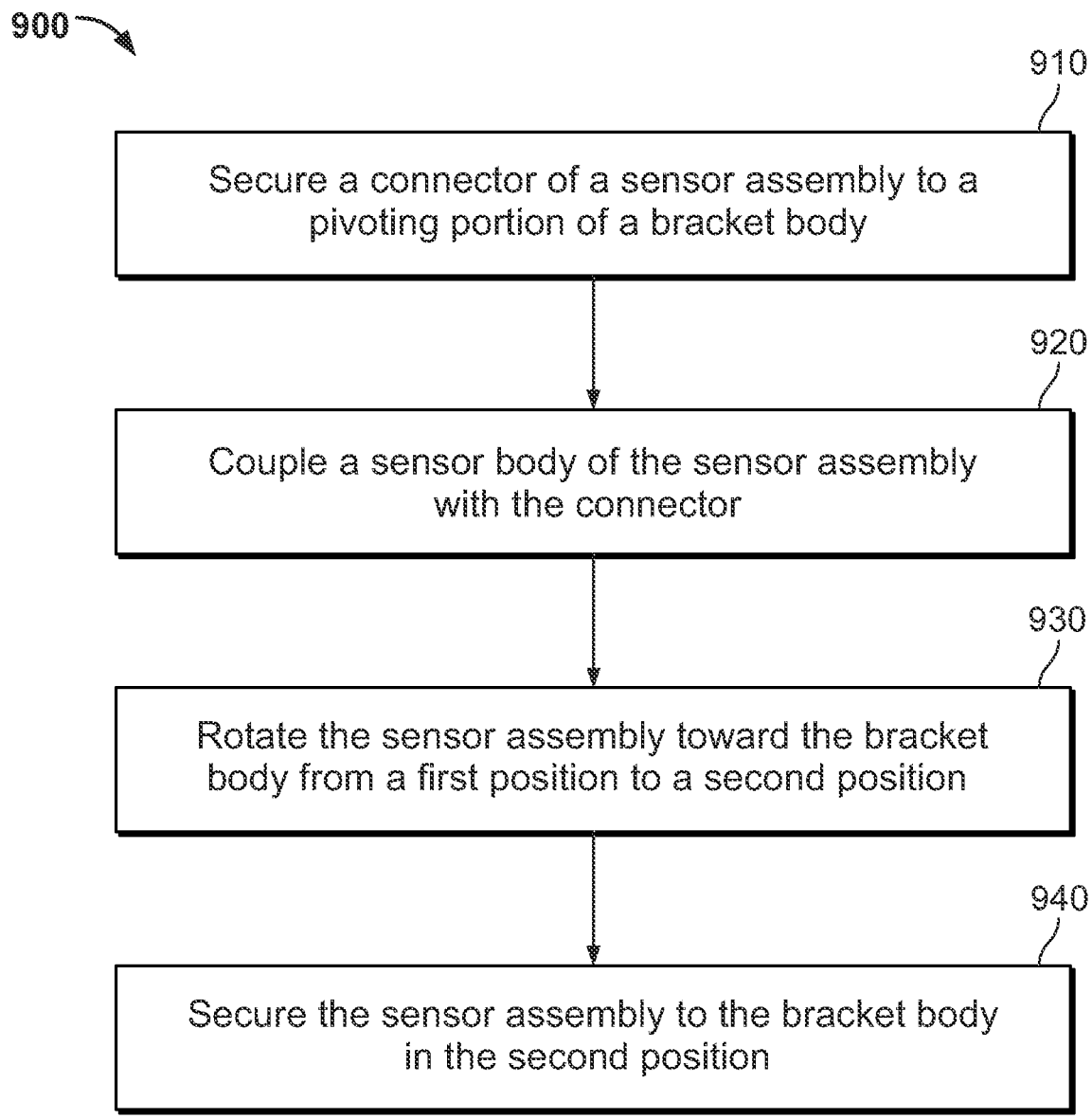
FIG. 39 is a flowchart illustrating another exemplary method of installing a sensor assembly onto a bracket body according to some embodiments of the present disclosure.

Referring still to FIG. 39, with the sensor body coupled to the connector of the sensor assembly, as in step 920, method 900 can further include step 930, which can include rotating the sensor assembly toward the bracket body from a first position to a second position. For example, with reference still to the first sensor assembly 404 and the first sensor portion 402a of the bracket body 402 of FIGS. 16-27, step 930 of method 900 can include rotating the first sensor assembly 404 with the first pivoting portion 566 in the direction of arrow C of FIG. 23 from the first position (as shown in FIG. 23) to the second position (as shown in FIGS. 16-18 and 24-27).

With the sensor assembly rotated to the second position, as in step 930, method 900 can further include step 940, which can include securing the sensor assembly to the bracket body in the second position. For example, with continued reference to the first sensor assembly 404 and the first sensor portion 402a of the bracket body 402 of FIGS. 16-27, step 940 of method 900 can include removably engaging the first and second clips 424a, 424b of the first sensor assembly 404 with the first and second fastener protrusions 486, 492, respectively, of the first sensor portion 402a of the bracket body 402 to secure the first sensor assembly 404 to the bracket body 402 in the second position (as shown in FIGS. 16-18 and 24-27).

In some embodiments, step 930 and step 940 of method 900 can be combined in that rotation of the sensor assembly to the second position from the first position, as in step 930, can result in the sensor assembly being secured to the bracket body, as in step 940. For example, referring still to the first sensor assembly 404 and the first sensor portion 402a of the bracket body 402 of FIGS. 16-27, the first and second clips 424a, 424b of the first sensor assembly 404 can be configured to removably engage the first and second fastener protrusions 486, 492, respectively, of the first sensor portion 402a of the bracket body 402 as a result of downward force applied to the first sensor assembly 404 as the first sensor assembly 404 is moved to the second position within the first sensor opening 430.

Variations and modifications of the foregoing are within the scope of the present disclosure. It is understood that the embodiments disclosed and defined herein extend to all alternative combinations of two or more of the individual features mentioned or evident from the text and/or drawings. All of these different combinations constitute various alternative aspects of the present disclosure.

It will be appreciated by those skilled in the art that while the invention has been described above in connection with particular embodiments and examples, the invention is not necessarily so limited, and that numerous other embodiments, examples, uses, modifications and departures from the embodiments, examples and uses are intended to be encompassed by the claims attached hereto. The entire disclosure of each patent and publication cited herein is incorporated by reference, as if each such patent or publication were individually incorporated by reference herein.

We claim:
1. A bracket assembly comprising:
   a bracket body including a pivoting portion that is pivotable relative to the bracket body; and
   a sensor assembly removably attached to the bracket body, the sensor assembly comprising:
      a connector configured to be removably attached to the pivoting portion of the bracket body;
      a sensor body configured to be removably coupled to the connector such that, when the sensor body is removably coupled to the connector, the sensor body is pivotable with the connector relative to the bracket body;
      a sensor attached to the sensor body and electrically coupled to the connector; and
      one or more sensor fasteners extending from the sensor body and configured to removably engage the bracket body, wherein the sensor assembly is rotatable relative to the bracket body via the pivoting portion between a first position, in which the sensor assembly is at an angle relative to the bracket body, and a second position, in which the sensor assembly is removably secured to the bracket body via the one or more sensor fasteners.

2. The bracket assembly of claim 1, wherein the pivoting portion is integrally formed with the bracket body.

3. The bracket assembly of claim 2, wherein a hinge is integrally disposed between the pivoting portion and the bracket body.

4. The bracket assembly of claim 1, wherein the pivoting portion includes a connector attachment structure configured to removably secure the connector to the pivoting portion in a first direction relative to the pivoting portion and in a second direction relative to the pivoting portion, the second direction being substantially perpendicular to the first direction.

5. The bracket assembly of claim 4, wherein the connector attachment structure comprises:
 a connector protrusion configured to secure the connector to the pivoting portion in the first direction; and
 one or more connector fasteners configured to secure the connector to the pivoting portion in the second direction.

6. The bracket assembly of claim 5, wherein the connector protrusion includes a connector channel configured to receive a portion of the connector.

7. The bracket assembly of claim 1, wherein the one or more sensor fasteners is configured to removably engage one or more fastener protrusions of the bracket body.

8. The bracket assembly of claim 7, wherein the one or more sensor fasteners includes a first sensor fastener extending outwardly from a first side of the sensor body and a second sensor fastener extending outwardly from a second side of the sensor body, opposite the first sensor fastener.

9. The bracket assembly of claim 8, wherein the first sensor fastener is a first clip configured to removably engage a first fastener protrusion of the bracket body, and the second sensor fastener is a second clip configured to removably engage a second fastener protrusion of the bracket body.

10. The bracket assembly of claim 9, wherein the bracket body includes a first fastener opening and a second fastener opening that extend through the bracket body adjacent to the first and second fastener protrusions, respectively, and
 wherein, when the sensor assembly is secured to a first side of the bracket body, the first and second clips are configured to be disengaged from the first and second protrusions, respectively, from a second side of the bracket body, opposite the first side, via the first and second fastener openings.

11. The bracket assembly of claim 1, wherein a sensor opening extends through the bracket body, and
 wherein the pivoting portion and at least a portion of the sensor body are at least partially received within the sensor opening when the sensor assembly is in the second position.

12. The bracket assembly of claim 1, wherein the bracket body includes first and second alignment slots that are configured to receive first and second lateral protrusions of the sensor body, respectively, as the sensor assembly is rotated from the first position to the second position.

13. The bracket assembly of claim 12, wherein first and second slot protrusions extend upward from the first and second alignment slots, respectively, and are configured to be slidably contacted by the first and second lateral protrusions of the sensor body as the sensor assembly is rotated from the first position toward the second position.

14. The bracket assembly of claim 13, wherein the first and second slot protrusions extend upward from first sides of the first and second alignment slots, respectively, and
 wherein, when the sensor assembly is in the second position, the first and second lateral protrusions are configured to contact second sides of the first and second alignment slots, respectively.

15. The bracket assembly of claim 12, wherein the bracket body further includes first and second ramps that are configured to be slidably engaged by third and fourth lateral protrusions of the sensor body, respectively, as the sensor assembly is rotated from the first position toward the second position.

16. A bracket body configured to receive a sensor assembly, the bracket body comprising:
 a pivoting portion extending from a sensor opening that extends through the bracket body, the pivoting portion being configured to removably receive a connector electrically coupled to the sensor assembly; and
 one or more fastener protrusions extending from the bracket body adjacent to the sensor opening,
 wherein the pivoting portion is configured to be rotatably moveable between a first position, in which the pivoting portion is at an angle relative to the bracket body, and a second position, in which the pivoting portion is disposed substantially within the sensor opening, and
 wherein the one or more fastener protrusions are configured to, when the connector is removably received by the pivoting portion and a sensor body of the sensor assembly is removably coupled to the connector, be removably engaged by one or more sensor fasteners of the sensor body to removably secure the sensor assembly to the bracket body as the pivoting portion moves from the first position to the second position.

17. The bracket body of claim 16, wherein a living hinge is integrally disposed between the pivoting portion and the bracket body.

18. The bracket body of claim 16, wherein the bracket body is configured to be removably secured to a windshield with the sensor assembly adjacent to the windshield.

19. A method for installing a sensor assembly onto a bracket body, the method comprising:
 securing a connector electrically coupled to the sensor assembly to a pivoting portion of the bracket body; and
 rotating the pivoting portion toward the bracket body from a first position to a second position to secure the sensor assembly to the bracket body with the pivoting portion and at least a portion of the sensor assembly received within a sensor opening of the bracket body.

20. The method of claim 19, wherein prior to the step of rotating the pivoting portion from the first position to the second position, the method further includes:
 coupling a sensor body of the sensor assembly with the connector when the pivoting portion is in a first position.

* * * * *